(12) United States Patent
Oh et al.

(10) Patent No.: US 11,192,425 B2
(45) Date of Patent: Dec. 7, 2021

(54) INTEGRATED THERMAL MANAGEMENT MODULE FOR VEHICLE

(71) Applicants: Hyundai Motor Company, Seoul (KR); Kia Motors Corporation, Seoul (KR); Hanon Systems, Daejeon (KR)

(72) Inventors: Man Ju Oh, Yongin-Si (KR); Sang Shin Lee, Suwon-Si (KR); Jae Woong Kim, Hwaseong-Si (KR); So La Chung, Seoul (KR); Yun Sub Chung, Daejeon (KR); Gum Bae Choi, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 92 days.

(21) Appl. No.: 16/833,283

(22) Filed: Mar. 27, 2020

(65) Prior Publication Data

US 2021/0053415 A1    Feb. 25, 2021

(30) Foreign Application Priority Data

Aug. 19, 2019    (KR) .................. 10-2019-0101213

(51) Int. Cl.
| | | |
|---|---|---|
| F25B 29/00 | (2006.01) | |
| B60H 1/00 | (2006.01) | |
| B60H 1/14 | (2006.01) | |

(52) U.S. Cl.
CPC ..... *B60H 1/00278* (2013.01); *B60H 1/00007* (2013.01); *B60H 1/00485* (2013.01); *B60H 1/143* (2013.01); *B60H 2001/00114* (2013.01)

(58) Field of Classification Search
CPC ............ B60H 1/00278; B60H 1/00007; B60H 1/00485; B60H 1/143; B60H 2001/00114
(Continued)

(56) References Cited

U.S. PATENT DOCUMENTS

| | | |
|---|---|---|
| 5,549,153 A | 8/1996 | Baruschke et al. |
| 8,215,432 B2 | 7/2012 | Nemesh et al. |

(Continued)

FOREIGN PATENT DOCUMENTS

| | | |
|---|---|---|
| DE | 102007063251 A1 | 7/2009 |
| DE | 102012010697 A1 | 12/2013 |

(Continued)

*Primary Examiner* — Davis D Hwu
(74) *Attorney, Agent, or Firm* — Morgan, Lewis & Bockius LLP

(57) ABSTRACT

An integrated thermal management module may include a first pump for flowing coolant of an indoor heating line for connecting a first heat exchanger heat-exchanged with a condenser of a refrigerant line and an indoor air-conditioning heating core, a second pump for flowing coolant of an indoor cooling line for connecting a second heat exchanger heat-exchanged with an evaporator of a refrigerant line and an indoor air-conditioning cooling core, a fourth pump for flowing coolant of a battery line for connecting a high-voltage battery core and a third radiator, a first valve simultaneously connected to a second radiator line for connecting the first heat exchanger and a second radiator, the indoor heating line, and the battery line to change flow direction of the coolant, and a second valve simultaneously connected to the indoor cooling line and the battery line to change flow direction of the coolant.

20 Claims, 15 Drawing Sheets

(58) Field of Classification Search
USPC .......................................................... 62/159
See application file for complete search history.

(56) References Cited

U.S. PATENT DOCUMENTS

| | | |
|---|---|---|
| 8,336,319 B2 | 12/2012 | Johnston et al. |
| 8,402,776 B2 | 3/2013 | Johnston et al. |
| 2013/0284415 A1 | 10/2013 | Katoh |
| 2014/0041826 A1 | 2/2014 | Takeuchi et al. |
| 2015/0258875 A1 | 9/2015 | Enomoto et al. |
| 2016/0107506 A1 | 4/2016 | Johnston |
| 2016/0339767 A1 | 11/2016 | Enomoto et al. |
| 2019/0168578 A1 | 6/2019 | Kim |
| 2019/0176571 A1 | 6/2019 | Oh |
| 2019/0308491 A1 | 10/2019 | Lee et al. |
| 2020/0346523 A1 | 11/2020 | Oh et al. |
| 2020/0353796 A1 | 11/2020 | Oh |
| 2020/0398636 A1* | 12/2020 | He ..................... B60H 1/3208 |

FOREIGN PATENT DOCUMENTS

| | | |
|---|---|---|
| DE | 102014111971 A1 | 2/2016 |
| DE | 112014005360 T5 | 8/2016 |
| JP | 2019-031109 A | 2/2019 |
| KR | 10-1448656 B1 | 10/2014 |
| KR | 10-1787503 B1 | 10/2017 |
| KR | 10-2018-0093184 A | 8/2018 |
| KR | 10-2019-0033115 A | 3/2019 |
| KR | 10-2019-0127219 A | 11/2019 |

* cited by examiner

INTEGRATED THERMAL MANAGEMENT MODULE FOR VEHICLE

CROSS REFERENCE TO RELATED APPLICATION

The present application claims priority to Korean Patent Application No. 10-2019-0101213 filed on Aug. 19, 2019, the entire contents of which is incorporated herein for all purposes by this reference.

BACKGROUND OF THE PRESENT INVENTION

Field of the Invention

The present invention relates to a thermal management module included in an integrated thermal management system for a vehicle for efficiently managing thermal management energy necessary for the indoor air conditioning of a vehicle and the heating and cooling of a battery.

Description of Related Art

Recently, an electric vehicle has emerged as social issues for solving problems such as implementation of an eco-friendly technology and energy depletion. The electric vehicle operates by use of a motor that receives electricity from a battery to output power. Therefore, the electric vehicle has been spotlighted as an eco-friendly vehicle because there is no emission of carbon dioxide, the noise is very small, and the energy efficiency of the motor higher than the energy efficiency of the engine.

The core technology in implementing such an electric vehicle is a technology related to a battery module, and recently, researches on light weight, miniaturization, and short charging time of battery have been actively conducted. The battery module may maintain optimal performance and long life only when used in the optimal temperature environment. However, it is difficult to use it in the optimal temperature environment by the heat generated at operation and an external temperature change.

Furthermore, since the electric vehicle does not have a waste heat source which is generated when combustion is performed by a separate engine like an internal combustion engine, it performs the indoor heating of the vehicle in winter as an electric heating device, and further, since a warm-up is required to enhance battery charge/discharge performance during cold weather, the electric vehicle utilizes it by forming a separate coolant heating type electric heater, respectively. That is, to maintain an optimal temperature environment of the battery module, a technology of operating a cooling and heating system for controlling the temperature of the battery module separately from the air conditioning system for air conditioning in the vehicle indoor is adopted. That is, two independent cooling and heating systems are constructed: one is used for indoor cooling and heating and the other is used for adjusting the temperature of the battery module.

However, when operated in the above method, energy is not managed efficiently, such that the range is short so long-distance operation is impossible, and the mileage is reduced by 30% or more at cooling in summer and 40% or more at heating in winter, further worsening the winter heating problem that has not been a problem in the internal combustion engine. There is a problem in that if a high capacity PTC is provided to solve the problem caused at heating in winter, a cost and a weight due to the shortening of the mileage and the use of a heat pump become excessive.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a thermal management module that modularizes a configuration of an integrated thermal management system for a vehicle integrating the indoor air conditioning of the vehicle and the cooling and heating of a battery.

An integrated thermal management module for a vehicle for achieving the object includes a first pump configured for flowing coolant of an indoor heating line for connecting a first heat exchanger of the indoor heating line heat-exchanged with a condenser of a refrigerant line and an indoor air-conditioning heating core of the indoor heating line; a second pump configured for flowing coolant of an indoor cooling line for connecting a second heat exchanger heat-exchanged with an evaporator of a refrigerant line and an indoor air-conditioning cooling core; a third pump configured for flowing coolant of an electric component line for connecting an electric component core of the electric component line and a first radiator; a fourth pump configured for flowing coolant of a battery line for connecting a high-voltage battery core and a third radiator; a first valve simultaneously connected to a second radiator line for connecting the first heat exchanger and a second radiator, the indoor heating line, and the battery line to change flow direction of the coolant; a second valve simultaneously connected to a third radiator line for connecting the second heat exchanger and the electric component core or the third radiator, the indoor cooling line, and the battery line to change flow direction of the coolant; a third valve connected between the third radiator line and the electric component line to change flow direction of the coolant; a fourth valve connected between a battery heating line, which is branched from the indoor heating line and connected to the battery line, and the indoor heating line to change flow direction of the coolant; a fifth valve connected between a battery cooling line, which is branched from the indoor cooling line and connected to the battery line, and the indoor cooling line to change flow direction of the coolant; and a seventh valve simultaneously connected to the battery line, the battery heating line, and the battery cooling line to change flow direction of the coolant.

The first pump, the second pump, the third pump, and the fourth pump, and the first valve, the second valve, the third valve, the fourth valve, the fifth valve, and the seventh valve may be modularized to be coupled integrally.

The integrated thermal management module for the vehicle may further include an upper plate extending in a planar direction and a lower plate extending in the same planar direction as the planar direction of the upper plate, and having a flow path formed between itself and the upper plate, and the first pump, the second pump, the third pump, and the fourth pump may be inserted into and fixed to the upper plate or the lower plate.

The integrated thermal management module for the vehicle may further include an upper plate extending in a planar direction and a lower plate extending in the same planar direction as the planar direction of the upper plate, and having a flow path formed between itself and the upper plate, and the first valve, the second valve, the third valve, the fourth valve, the fifth valve, and the seventh valve may be inserted into the flow path formed between the upper plate and the lower plate to change flow direction of the coolant.

The integrated thermal management module for the vehicle may further include a hydrothermal heater provided in the indoor heating line, heating the coolant flowing therein, and modularized with the first pump, the second pump, the third pump, the fourth pump, the first valve, the second valve, the third valve, the fourth valve, the fifth valve, and the seventh valve to be coupled integrally.

The integrated thermal management module for the vehicle may further include the condenser provided in the refrigerant line, and connected to be heat-exchanged with the first heat exchanger; the evaporator provided in the refrigerant line, and connected to be heat-exchanged with the second heat exchanger; and a compressor provided in the refrigerant line, and configured for compressing the refrigerant therein, and the condenser, the evaporator, and the compressor may be modularized with the first pump, the second pump, the third pump, the fourth pump, the first valve, the second valve, the third valve, the fourth valve, the fifth valve, and the seventh valve to be coupled integrally.

The integrated thermal management module for the vehicle may further include a six valve connected between a battery recovery line, which is branched from the battery line and connected to the indoor heating line or the second radiator line, and the battery line to change flow direction of the coolant.

The integrated thermal management module for the vehicle may further include a controller connected to the fourth pump and the seventh valve and configured for controlling the fourth pump and the seventh valve so that the coolant having passed through the high-voltage battery core is introduced into the first radiator, in a first mode of cooling the high-voltage battery core through the first radiator.

The integrated thermal management module for the vehicle may further include a controller connected to the third pump and the third valve and configured for controlling the third pump and the third valve so that the coolant having passed through the electric component core is introduced into the third radiator, in a second mode of cooling the electric component core through the third radiator.

The integrated thermal management module for the vehicle may further include a controller connected to the fourth pump and the seventh valve and configured for controlling the fourth pump and the seventh valve so that the coolant having passed through the high-voltage battery core is introduced into the first, and configured of controlling radiator, and configured of controlling the third pump and the third valve so that the coolant having passed through the electric component core is introduced into the third radiator, in a third mode of cooling the high-voltage battery core through the first radiator and cooling the electric component core through the third radiator.

The integrated thermal management module for the vehicle may further include a controller connected to the second pump, the second valve, and the fifth valve and configured for controlling the second pump, the second valve, and the fifth valve so that the coolant having passed through the second heat exchanger is introduced into the indoor air-conditioning cooling core, and configured of controlling the first pump and the first valve so that the coolant having passed through the first heat exchanger is introduced into the second radiator, in a fourth mode of discharging the cooled air to the indoor space of the vehicle.

The integrated thermal management module for the vehicle may further include a controller connected to the second pump, the second valve, the fifth valve, and the seventh valve and configured for controlling the second pump, the second valve, the fifth valve, and the seventh valve so that the coolant having passed through the second heat exchanger is introduced into the indoor air-conditioning cooling core and then introduced into the high-voltage battery core, and configured of controlling the first pump and the first valve so that the coolant having passed through the first heat exchanger is introduced into the second radiator, in a fifth mode of cooling the high-voltage battery core and discharging the cooled air to the indoor space of the vehicle.

The integrated thermal management module for the vehicle may further include a controller connected to the first pump, the first valve, and the fourth valve and configured for controlling the first pump, the first valve, and the fourth valve so that the coolant having passed through the first heat exchanger is introduced into the indoor air-conditioning heating core, and configured of controlling the third pump, the second valve, and the third valve so that the coolant having passed through the second heat exchanger is introduced into the electric component core, in a sixth mode of recovering waste heat of the electric component core and discharging the heated air to the indoor space of the vehicle.

The integrated thermal management module for the vehicle may further include a controller connected to the first pump, the first valve, and the fourth valve and configured for controlling the first pump, the first valve, and the fourth valve so that the coolant having passed through the first heat exchanger is introduced into the indoor air-conditioning heating core, and configured of controlling the second pump, the second valve, and the third valve so that the coolant having passed through the second heat exchanger is introduced into the third radiator, in a seventh mode of absorbing heat from the third radiator and discharging the heated air to the indoor space of the vehicle.

The integrated thermal management module for the vehicle may further include a controller connected to the first pump, the first valve, the seventh valve, and the fourth valve and configured for controlling the first pump, the first valve, the seventh valve, and the fourth valve so that the coolant having passed through the first heat exchanger is introduced into the high-voltage battery core and then introduced into the indoor air-conditioning heating core, and configured of controlling the third pump, the second valve, and the third valve so that the coolant having passed through the second heat exchanger is introduced into the electric component core, in an eighth mode of recovering waste heat of the electric component core, heating the high-voltage battery core, and discharging the heated air to the indoor space of the vehicle.

The integrated thermal management module for the vehicle may further include a controller connected to the first pump, the first valve, the seventh valve, and the fourth valve and configured for controlling the first pump, the first valve, the seventh valve, and the fourth valve so that the coolant having passed through the first heat exchanger is introduced into the high-voltage battery core and then introduced into the indoor air-conditioning heating core, and configured of controlling the second pump, the second valve, and the third valve so that the coolant having passed through the second heat exchanger is introduced into the third radiator, in a ninth mode of absorbing heat from the third radiator, heating the high-voltage battery core, and discharging the heated air to the indoor space of the vehicle.

The integrated thermal management module for the vehicle may further include a controller connected to the first pump, the first valve, and the fourth valve and configured for controlling the first pump, the first valve, and the fourth valve so that the coolant having passed through the first heat exchanger is introduced into the indoor air-conditioning heating core, and configured of controlling the second pump, the second valve, and the fifth valve so that the coolant having passed through the second heat exchanger is introduced into the indoor air-conditioning cooling core, in a tenth mode of discharging the dehumidified air to the indoor space of the vehicle.

An integrated thermal management module for a vehicle for achieving the object includes a first pump configured for flowing coolant of an indoor heating line for connecting a first heat exchanger of the indoor heating line heat-exchanged with a condenser of a refrigerant line and an indoor air-conditioning heating core of the indoor heating line; a second pump configured for flowing coolant of an indoor cooling line for connecting a second heat exchanger heat-exchanged with an evaporator of a refrigerant line and an indoor air-conditioning cooling core; a fourth pump configured for flowing coolant of a battery line for connecting a high-voltage battery core and a third radiator; a first valve simultaneously connected to a second radiator line for connecting the first heat exchanger and a second radiator, the indoor heating line, and the battery line to change flow direction of the coolant; and a second valve simultaneously connected to the indoor cooling line and the battery line to change flow direction of the coolant.

The integrated thermal management module for the vehicle may further include a fourth valve connected between a battery heating line, which is branched from the indoor heating line and connected to the battery line, and the indoor heating line to change flow direction of the coolant; a fifth valve connected between a battery cooling line, which is branched from the indoor cooling line and connected to the battery line, and the indoor cooling line to change flow direction of the coolant; and a seventh valve simultaneously connected to the battery line, the battery heating line, and the battery cooling line to change flow direction of the coolant.

According to the integrated thermal management module for the vehicle of the present invention, it is possible to adjust the heat exchange with the coolant lines while minimizing the refrigerant line to enable the integrated thermal management.

Furthermore, it is possible to compactly form the integrated thermal management module to have an effect of the package aspect and the space utilization.

The integrated thermal management module for the vehicle of the present invention may replace the function of the heat pump to enhance the thermal management efficiency, increasing the Distance to Empty of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
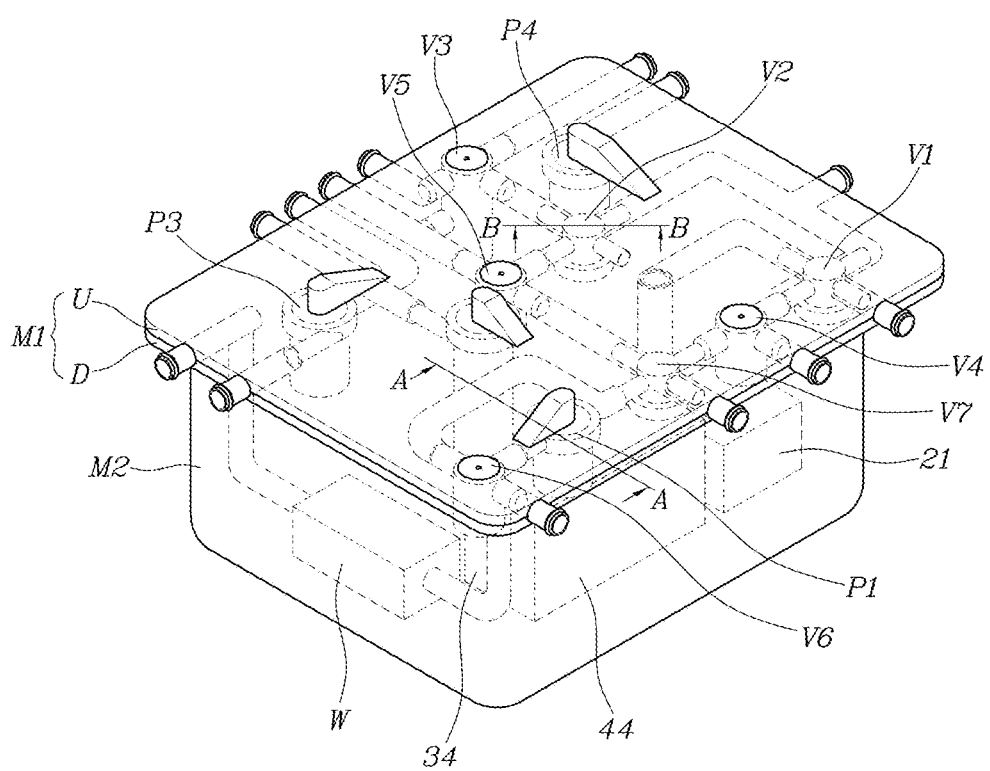
FIG. 1 is a perspective diagram of an integrated thermal management module for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of the exemplary embodiments of the present invention disclosed in the specification or application are only for the purpose of illustrating the exemplary embodiments of the present invention, and the exemplary embodiments in accordance with various aspects of the present invention may be embodied in various forms and should not be construed as limited to the exemplary embodiments set forth in the specification or application.

Various modifications and various forms may be made in the exemplary embodiments according to an exemplary embodiment of the present invention, so that specific embodiments are illustrated in the drawings and described in detail in the specification or application. It may be understood, however, that it is not intended to limit the exemplary embodiments in accordance with the concepts of the present invention to the included forms, but includes all modifications, equivalents, and alternatives falling within the spirit and technical scope of the present invention.

The terms "first" and/or "second," and the like may be used to illustrate various components, but the components may not be limited by the terms. The terms are used to differentiate one element from another, for example, a first component may be referred to as a second component, and similarly, the second component may be also referred to as the first component without departing from claims in accordance with the concepts of the present invention.

It will be understood that when an element is referred to as being "connected" or "coupled" to another element, it may be "directly connected" or "coupled" to the other element, but also to the other element with other elements interposed therebetween. On the other hand, it may be understood that any configuration element has no other element in between the time stated that "directly connected" or "directly coupled" to another element. Other expressions that describe the relationship between elements, such as "between" and "directly between" or "adjacent to" and "directly adjacent to" may be interpreted as well.

The terminology used the specification is for the purpose of describing various exemplary embodiments only and is not intended to limit the present invention. The singular forms are intended to include the plural forms as well, unless the context clearly indicates otherwise. In the specification, it will be further understood that the terms "comprises" or "includes," and the like specify the presence of stated features, integers, steps, operations, elements, components or combination thereof, but do not preclude the presence or addition of one or more other features, integers, steps, operations, elements, components, or combination thereof.

Unless otherwise defined, all terms including technical and scientific terms used herein have the same meaning as commonly understood by one of ordinary skill in the art to which an exemplary embodiment of the present invention belongs. It will be further understood that terms, such as those defined in commonly used dictionaries, may be additionally interpreted as having a meaning which is consistent with their meaning in the context of the relevant art, and will not be interpreted in an idealized or overly formal sense unless so defined in the specification.

Hereinafter, the present invention will be described in detail by describing exemplary embodiments of the present invention with reference to the accompanying drawings. The same reference numerals indicated in each drawing denote the same members.

A vehicle is provided with various heat-generating devices, such as an electric component including a motor and an inverter, a high-voltage battery, and an indoor air conditioner for the vehicle. They need to be managed with temperature sections differently from each other, and may be implemented independently at different initial time points.

Figure 2:
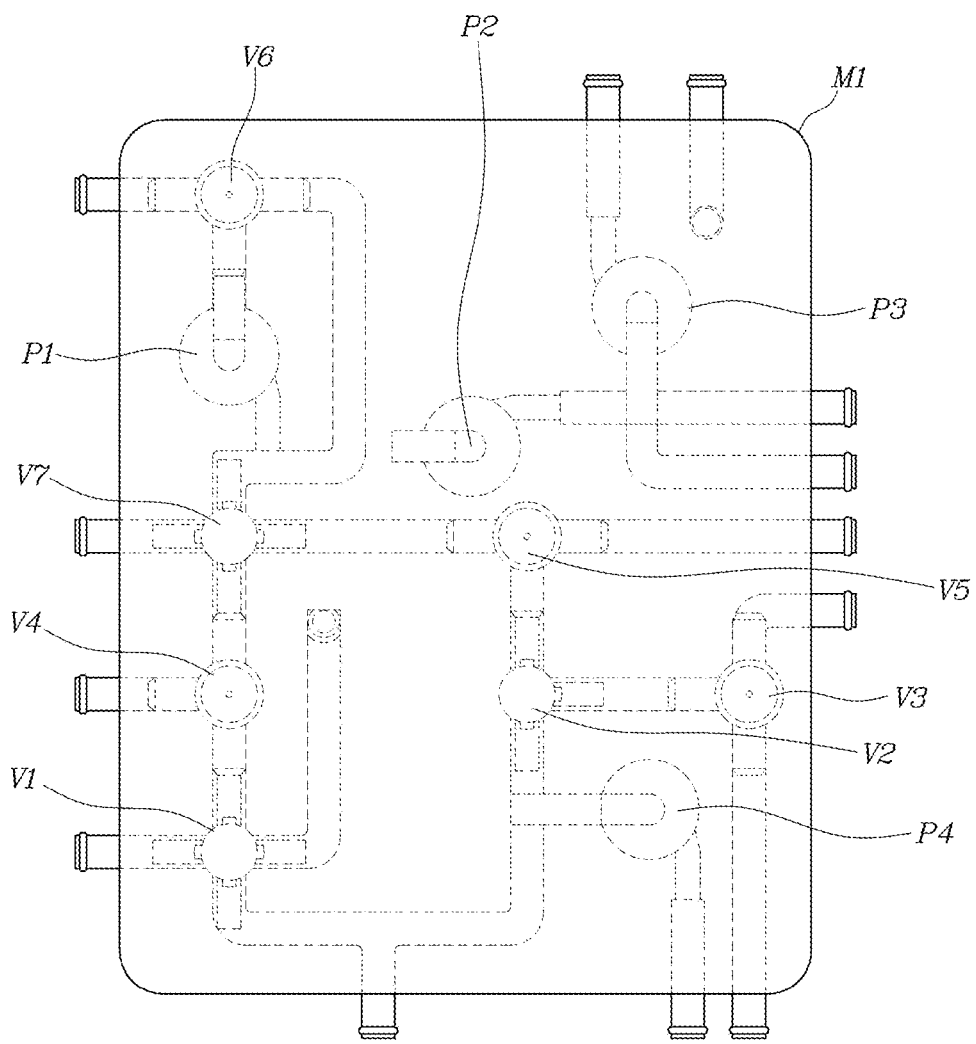
FIG. 2 is a top diagram of the integrated thermal management module for the vehicle according to an exemplary embodiment of the present invention.

FIG. 1 is a perspective diagram of an integrated thermal management module for a vehicle according to an exemplary embodiment of the present invention, and FIG. 2 is a top diagram of the integrated thermal management module for the vehicle according to an exemplary embodiment of the present invention.

Referring to FIG. 1 and FIG. 2, the integrated thermal management module for the vehicle according to an exemplary embodiment of the present invention includes a first pump (P1) for flowing the coolant of an indoor heating line 40 for connecting a first heat exchanger 44, which undergoes heat transfer with a condenser 23 of a refrigerant line 20, and an indoor air-conditioning heating core 42; a second pump (P2) for flowing the coolant of an indoor cooling line 30 for connecting a second heat exchanger 34, which undergoes heat transfer with an evaporator 24 of the refrigerant line 20, and an indoor air-conditioning cooling core 32; a third pump (P3) for flowing the coolant of an electric component line 120 for connecting an electric component core (PE) and a first radiator (R1); a fourth pump (P4) for flowing the coolant of a battery line 10 for connecting a high-voltage battery core (B) and a third radiator (R3); a first valve (V1) simultaneously connected to a second radiator line 90 for connecting the first heat exchanger 44 and a second radiator (R2), the indoor heating line 40, and the battery line 10 to change flow direction of the coolant; a second valve (V2) simultaneously connected to a third radiator line 100 for connecting the second heat exchanger 34 and the electric component core or the third radiator (R3), the indoor cooling line 30, and the battery line 10 to change flow direction of the coolant; a third valve (V3) connected between a battery heating line 60, which is branched from the indoor heating line 40 and connected to the battery line 10, and the indoor heating line 40 to change flow direction of the coolant; a fifth valve (V5) connected between a battery cooling line 50, which is branched from the indoor cooling line 30 and connected to the battery line 10, and the indoor cooling line 30 to change flow direction of the coolant; and a seventh valve (V7) simultaneously connected to the battery line 10, the battery heating line 60, and the battery cooling line 50 to change flow direction of the coolant.

Therefore, it is possible to control the first pump (P1), the second pump (P2), the third pump (P3), the fourth pump (P4), the first valve (V1), the second valve (V2), the third valve (V3), the fourth valve (V4), the fifth valve (V5), and the seventh valve (V7) to adjust the heat-exchange with the coolant lines while minimizing the refrigerant line 20, facilitating the integrated thermal management.

The integrated thermal management module for the vehicle of the present invention may replace the function of a heat pump to enhance the thermal management efficiency, increasing the Distance to Empty of the vehicle.

The first pump (P1), the second pump (P2), the third pump (P3), the fourth pump (P4), the first valve (V1), the second valve (V2), the third valve (V3), the fourth valve (V4), the fifth valve (V5), and the seventh valve (V7) may be modularized to be integrally coupled. That is, the first pump (P1), the second pump (P2), the third pump (P3), the fourth pump (P4120), the first valve (V1), the second valve (V2), the third valve (V3), the fourth valve (V4), the fifth valve (V5), and the seventh valve (V7) are configured in a single module to be compactly arranged, and may be integratedly controlled by the controller 110 to be described later.

Therefore, the integrated thermal management module for the vehicle may be compactly configured to have an effect of package aspect and space utilization.

The integrated thermal management module for the vehicle may further include an upper plate (U) extending in the planar direction thereof; and a lower plate (D) extending in the same plane direction as the upper plate (U), and having a flow path formed between itself and the upper plate (U).

A coupled body of the upper plate (U) and the lower plate (D) may form a first portion (M1), and a second portion (M2) may be coupled to the lower portion of the first portion (M1). A space is formed in the second portion (M2), and the refrigerant line 20, the first heat exchanger 44, the second heat exchanger 34, a hydrothermal heater (W), and the like to be described later may be mounted therein.

The upper plate (U) and the lower plate (D) may be coupled in a state where the lower surface and the upper surface-contact each other. The upper plate (U) is bent upwards in some areas and the lower plate (D) is bent downwards in some areas, such that the flow path may formed therebetween upon the coupling of the upper plate (U) and the lower plate (D).

The flow path may be a portion of the coolant lines including the indoor heating line 40, the indoor cooling line 30, the electric component line 110, the battery line 10, the second radiator line 90, the third radiator line 100, and the like.

Furthermore, the integrated thermal management module for the vehicle may further include a sixth valve (V6) connected between the batter recovery line, which is branched from the battery line 10 and connected to the indoor heating line 40 or the second radiator line 90, and the battery line 10 to change flow direction of the coolant.

The battery recovery line 85 may connect the point, which is branched into or joined to the indoor heating line 40 and the second radiator line 90, and the battery line 10. The sixth valve (V6) may be positioned at the point branched from the battery line 10 to the battery recovery line 85.

Figure 3:
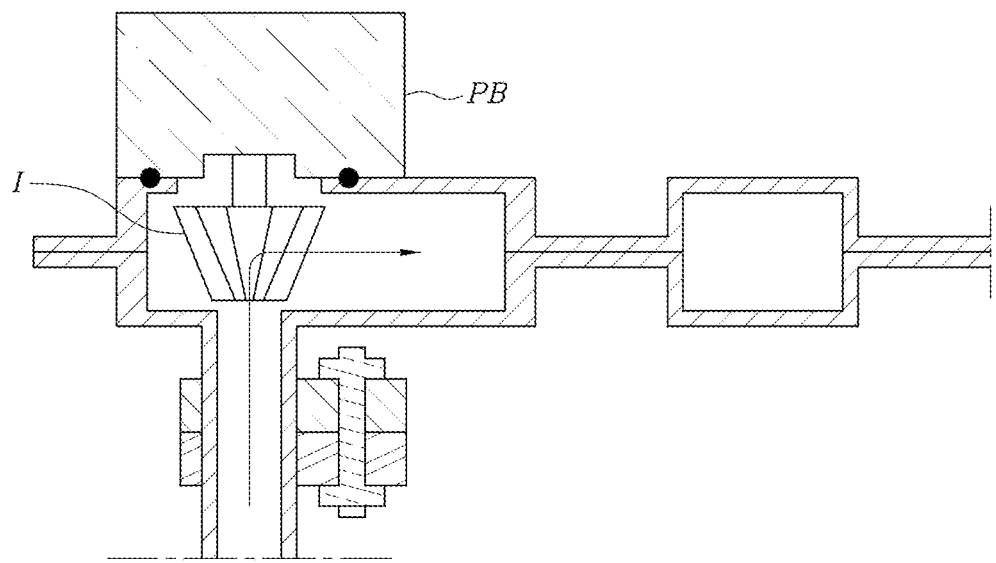
FIG. 3 is a cross-sectional diagram taken along the line A-A of FIG. 1.

FIG. 3 is a cross-sectional diagram taken along the line A-A of FIG. 1.

Further referring to FIG. 3, the first pump (P1), the second pump (P2), the third pump (P3), and the fourth pump (P4) are inserted into and fixed to the upper plate (U) or the lower plate (D).

In an exemplary embodiment of the present invention, the first pump (P1), the second pump (P2), the third pump (P3), and the fourth pump (P4) may be inserted into and fixed to the flow path formed between the upper plate (U) and the lower plate (D) through a through hole formed in the upper plate (U). An impeller (I) of the first pump (P1), the second pump (P2), the third pump (P3), and the fourth pump (P4) may be inserted into the flow path, and a pump body (PB) may be positioned outside the upper plate (U) or the lower plate (D).

Figure 4:
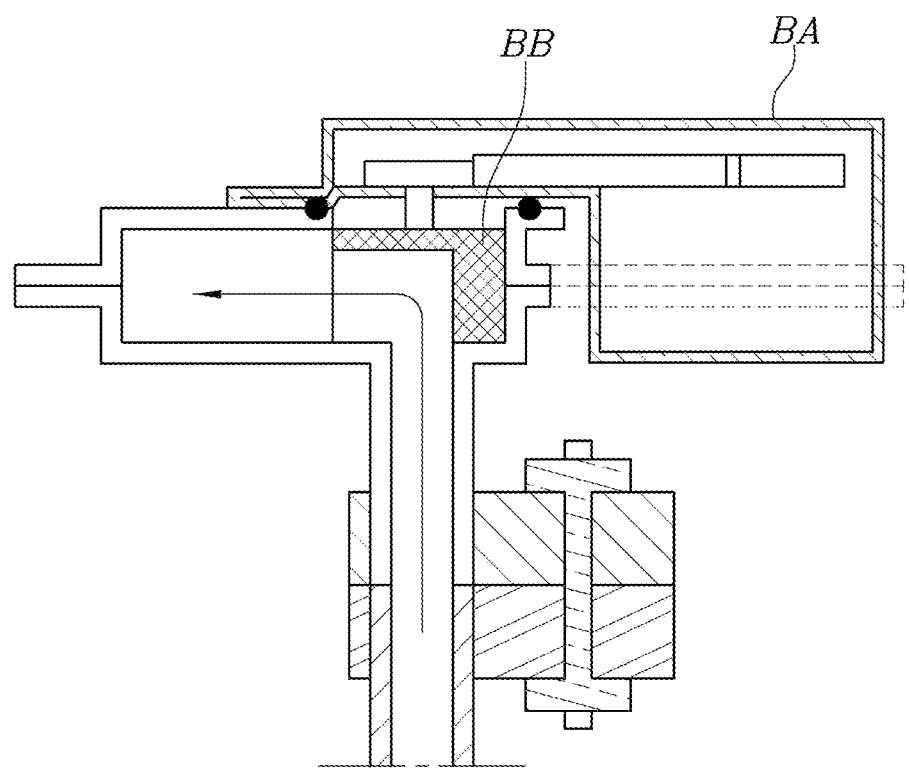
FIG. 4 is a cross-sectional diagram taken along the line B-B of FIG. 1.

FIG. 4 is a cross-sectional diagram taken along the line B-B of FIG. 1.

Further referring to FIG. 4, the first valve (V1), the second valve (V2), the third valve (V3), the fourth valve (V4), the fifth valve (V5), and the seventh valve (V7) may be inserted into the flow path formed between the upper plate (U) and the lower plate (D) to change flow direction of the coolant.

The first valve (V1), the second valve (V2), the third valve (V3), the fourth valve (V4), the fifth valve (V5), and the seventh valve (V7) may be a multiport valve such as a 3-Way or four-way valve, and may be positioned at the point where a plurality of flow paths formed between the upper plate (U) and the lower plate (D) are branched or joined. The first valve (V1), the second valve (V2), and the seventh valve (V7) are a four-way valve, and the third valve (V3), the fourth valve (V4), the fifth valve (V5), and the sixth valve (V6) may be a three-way valve.

As illustrated, the first valve (V1), the second valve (V2), the third valve (V3), the fourth valve (V4), the fifth valve (V5), and the seventh valve (V7) may change flow direction of the coolant as the valve body (BB) positioned in the flow path is rotated. A valve actuator (BA) for rotating the valve body (BB) may be positioned outside the upper plate (U) or the lower plate (D).

The integrated thermal management module for the vehicle may further include the hydrothermal heater (W), which is provided in the indoor heating line 40, heats the coolant flowing therein, and modularized with the first pump (P1), the second pump (P2), the third pump (P3), the fourth pump (P4), the first valve (V1), the second valve (V2), the third valve (V3), the fourth valve (V4), the fifth valve (V5), and the seventh valve (V7) to be coupled integrally.

The hydrothermal heater (W) may heat the coolant therein by use of the power supplied from a high-voltage battery or the like. If the high-voltage battery or the waste heat of the electronic component is not available, or the amount of heat is insufficient, the coolant may be heated through the hydrothermal heater (W).

The hydrothermal heater (W) may be positioned below the upper plate (U) and the lower plate (D) to be modularized integrally.

The integrated thermal management module for the vehicle may further include the condenser 23 provided in the refrigerant line 20 and connected to exchange the heat with the first heat exchanger 44; the evaporator 24 provided in the refrigerant line 20 and connected to exchange the heat with the second heat exchanger 34; and a compressor 21 provided in the refrigerant line 20 and configured for compressing the refrigerant therein, and the condenser 23, the evaporator 24, and the compressor 21 may be modularized with the first pump (P1) and the second pump (P2), the third pump (P3), the fourth pump (P4), the first valve (V1), the second valve (V2), the third valve (V3), the fourth valve (V4), the fifth valve (V5), and the seventh valve (V7) to be coupled integrally.

The refrigerant line 20 may also be positioned below the upper plate (U) and the lower plate (D) to be modularized integrally. That is, all of the entire refrigerant line 20, the condenser 23, the evaporator 24, and the compressor 21 may be modularized with the first pump (P1) and the second pump (P2), the third pump (P3), the fourth pump (P4), the first valve (V1), the second valve (V2), the third valve (V3), the fourth valve (V4), the fifth valve (V5), and the seventh valve (V7) to be coupled integrally. An expansion valve 22 provided in the refrigerant line 20 may be positioned at the upstream point of the evaporator 24.

Figure 5:
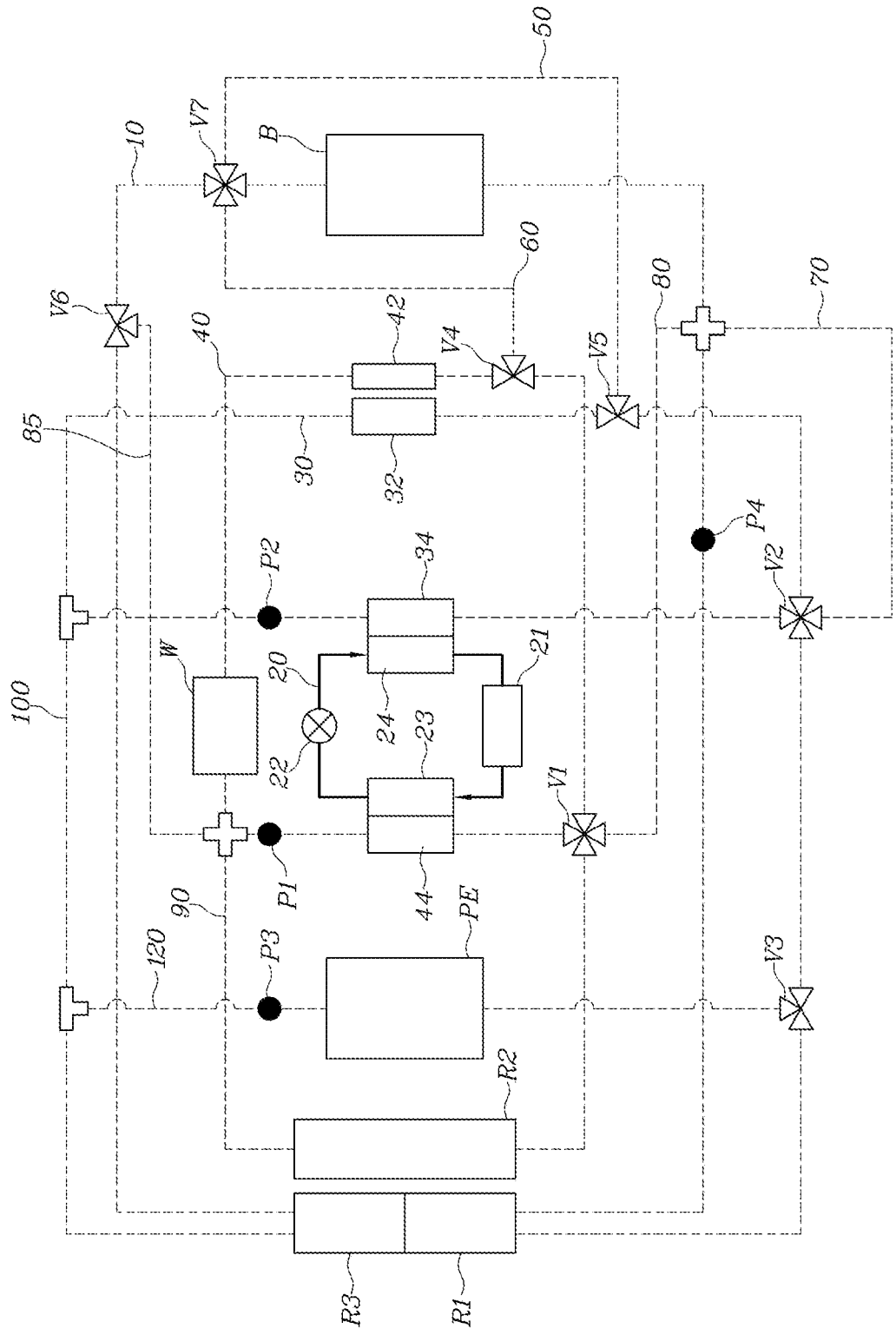
FIG. 5 is a diagram illustrating an integrated thermal management circuit diagram including the integrated thermal management module for the vehicle according to an exemplary embodiment of the present invention.
Figure 6:
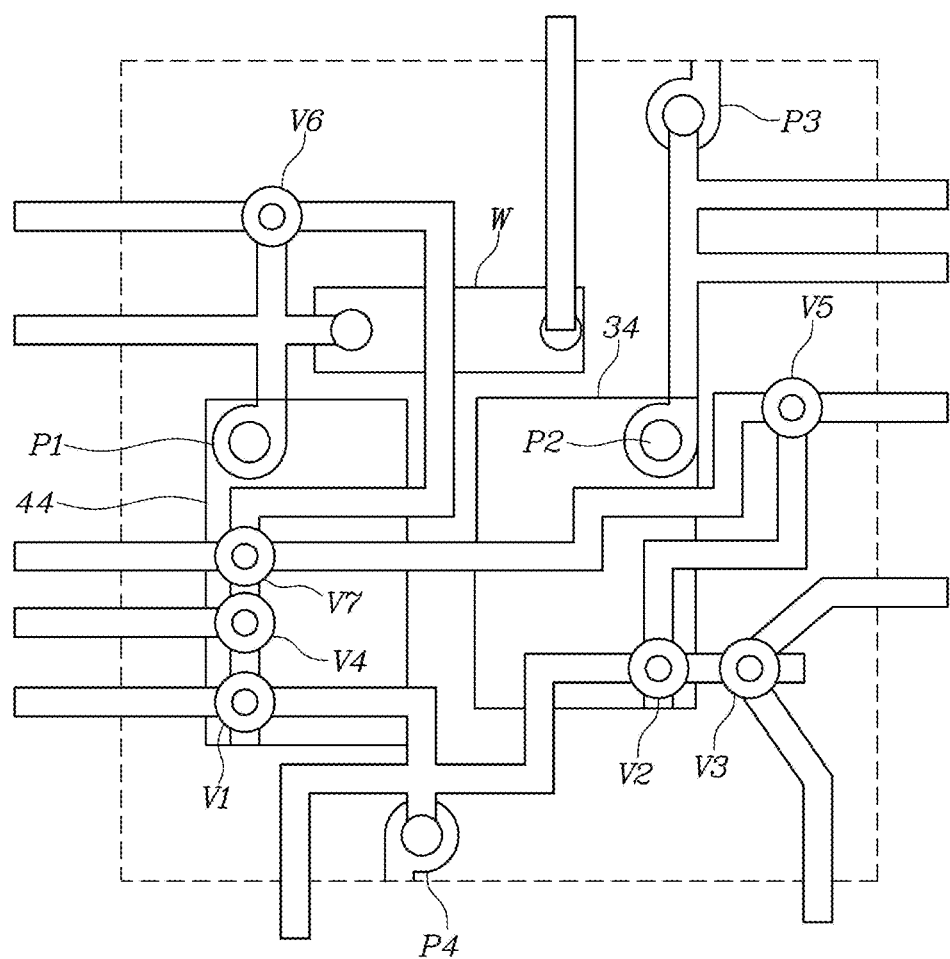
FIG. 6 is a diagram schematically illustrating a configuration of the integrated thermal management module for the vehicle according to an exemplary embodiment of the present invention.

FIG. 5 is an integrated thermal management circuit diagram including the integrated thermal management module for the vehicle according to an exemplary embodiment of the present invention, and FIG. 6 is a diagram schematically illustrating a configuration of the integrated thermal management module for vehicle according to an exemplary embodiment of the present invention.

Further referring to FIG. 5 and FIG. 6, the thermal management circuit including the integrated thermal management module for the vehicle according to an exemplary embodiment of the present invention includes the battery line 10 for connecting so that the first radiator (R1) and the high-voltage battery core (B) are heat-exchanged, and having the fourth pump (P4) to communicate the coolant; the refrigerant line 20 having the compressor 21, the expansion valve 22, the condenser 23, and the evaporator 24 in which the refrigerant is circulated; the indoor cooling line 30 for connecting so that the indoor air-conditioning cooling core 32 undergoes heat transfer with the evaporator 24 through the second heat exchanger 34, and having the second pump (P2) to communicate the refrigerant; the indoor heating line 40 for connecting so that the indoor air-conditioning heating core 42 undergoes heat transfer with the condenser 23 through the first heat exchanger 44, and having the first pump (P1) to communicate the refrigerant; the battery cooling line 50 branched from the downstream point of the indoor air-conditioning cooling core 32 in the indoor cooling line 30 and connected to the upstream point of the high-voltage battery core (B) in the battery line 10, and having the fifth valve (V5) for adjusting whether to introduce the coolant having passed through the indoor air-conditioning cooling core 32 into the high-voltage battery core (B); and the batter heating line 60 branched from the downstream point of the indoor air-conditioning cooling core 42 in the indoor cooling line 40 and connected to the upstream point of the high-voltage battery core (B) in the battery line 10, and having the fourth valve (V4) for adjusting whether to introduce the coolant having passed through the indoor air-conditioning cooling core 42 into the high-voltage battery core (B).

The battery line 10 has the high-voltage battery core (B), and has the first radiator (R1) for cooling the high-voltage battery core (B) by use of the outside air and the fourth pump (V4) controlled to be driven and stopped by the controller 110 and for circulating the coolant. The high-voltage battery core (B) may also be a heat-dissipation unit directly connected to the high-voltage battery, and is a concept including both the above and the heat-dissipation unit indirectly connected to the high-voltage battery through a separate coolant line.

Furthermore, the refrigerant line 20 including the compressor 21, the expansion valve 22, the condenser 23, and the evaporator 24 is thermally connected to other lines while the refrigerant is circulated. The driving of the compressor 21 is controlled by the controller 110, and the heat is exchanged with other lines through the heat-dissipation and the heat-absorption while the refrigerant circulates the compressor 21, the condenser 23, the expansion valve 22, and the evaporator 24.

The refrigerant line 20 is thermally connected to the indoor cooling line 30 and the indoor heating line 40. The indoor cooling line 30 is controlled to be driven and stopped by the indoor air-conditioning cooling core 32 and the controller 110, and is provided with the second pump (P2) for circulating the coolant. Furthermore, the indoor cooling line 30 is provided with the second heat exchanger 34 to exchange heat with the evaporator 24 of the refrigerant line 20 to thermally connect the indoor cooling line 30 and the refrigerant line 20. Furthermore, the air passing through the indoor air-conditioning cooling core 32 may be cooled to discharge cold air into the indoor space of the vehicle.

The indoor heating line 40 is controlled to be driven and stopped by the indoor air-conditioning heating core 42 and the controller 110, and is provided with the first pump (P1) for circulating the coolant. Furthermore, the indoor heating line 40 is provided with the first heat exchanger 44 to exchange heat with the condenser 23 of the refrigerant line 20 to thermally connect the indoor heating line 40 and the refrigerant line 20. Furthermore, the air passing through the indoor air-conditioning heating core 42 may be heated to discharge warm air into the indoor space of the vehicle.

Furthermore, in an exemplary embodiment of the present invention, the battery cooling line 50 and the battery heating line 60 are prepared. The battery cooling line 50 is branched at the downstream point of the indoor air-conditioning cooling core 32 of the indoor cooling line 30 and connected to the upstream point of the high-voltage battery core (B) of the battery line 10. Therefore, the coolant having passed through the indoor air-conditioning cooling core 32 of the indoor cooling line 30 may be communicated to the battery line 10 through the battery cooling line 50. Therefore, the coolant having passed through the indoor air-conditioning cooling core 32 may be introduced into the high-voltage battery core (B). The conventional thermal management system for the vehicle has been provided with a coolant line and the refrigerant line 20 for the indoor cooling air conditioning, and a separate coolant line and the refrigerant line 20 have been required to cool the high-voltage battery. In an exemplary embodiment of the present invention, the indoor cooling line 30 and the battery line 10 may be connected through the battery cooling line 50 to perform the indoor cooling air conditioning and the cooling of the high-voltage battery core (B) with only one refrigerant line 20. Therefore, the amount of refrigerant used is significantly reduced so there is also an eco-friendly advantage. Furthermore, the battery cooling line 50 is provided with the fifth valve (V5) controlled by the controller 110 to selectively connect a flow path or to control a flow rate. Therefore, according to the control of the fifth valve (V5), it is possible to adjust whether the coolant having passed through the indoor air-conditioning cooling core 32 is introduced into the high-voltage battery core (B).

Meanwhile, the battery heating line 60 is branched from the downstream point of the indoor air-conditioning heating core 42 of the indoor cooling line 30 and connected to the upstream point of the high-voltage battery core (B) of the battery line (10). Therefore, the coolant having passed through the indoor air-conditioning heating core 42 of the indoor heating line 40 may be communicated to the battery line 10 through the battery heating line 60. Therefore, the coolant having passed through the indoor air-conditioning heating core 42 may be introduced into the high-voltage battery core (B). The conventional thermal management system for the vehicle has been provided with a coolant line and the refrigerant line 20 for the indoor heating air conditioning, and a separate coolant line and the refrigerant line 20 have been required to heat the high-voltage battery. In an exemplary embodiment of the present invention, the indoor heating line 40 and the battery line 10 may be connected through the first battery heating line 60 to perform the indoor heating air conditioning and the heating of the high-voltage battery core (B) with only one refrigerant line 20. Therefore, the amount of refrigerant used is significantly reduced and there is also an eco-friendly advantage. Furthermore, the battery heating line 60 is provided with the fourth valve (V4) controlled by the controller 110 to selectively connect a flow path or to control a flow rate. Therefore, according to the control of the fourth valve (V4), it is possible to adjust whether the coolant having passed through the indoor air-conditioning heating core 42 is introduced into the high-voltage battery core (B).

Meanwhile, the present invention may further include a first connection line 70 branched at the downstream point of the high-voltage battery core (B) of the battery line 10, respectively and connected to the upstream point of the second heat exchanger 34 of the indoor cooling line 30 and a second connection line 80 connected to the upstream point of the first heat exchanger 44 of the indoor heating line 40, and the battery cooling line 50 and the battery heating line 60 may be connected to the battery line 10 through the seventh valve (V7). The first connection line 70 is branched at the downstream point of the high-voltage battery core (B) of the battery line 10 and connected to the upstream point of the second heat exchanger 34 of the indoor cooling line 30. Therefore, the coolant introduced into the high-voltage battery core (B) through the battery cooling line 50 passes through the high-voltage battery core (B) and then is introduced into the second heat exchanger 34 through the first connection line 70. Furthermore, the second connection line 80 is branched at the downstream point of the high-voltage battery core (B) of the battery line 10 and connected to the upstream point of the first heat exchanger 44 of the indoor heating line 40. Therefore, the coolant introduced into the high-voltage battery core (B) through the battery heating line 60 passes through the high-voltage battery core (B) and then is introduced into the first heat exchanger 44 through the second connection line 80.

Furthermore, the battery cooling line 50 and the battery heating line 60 may be connected to the battery line 10 through the seventh valve (V7). The seventh valve (V7) is controlled by the controller 110 to selectively connect a flow path or to control a flow rate. Therefore, it is possible to adjust the communication of the coolant of the battery line 10, the battery cooling line 50, and the battery heating line 60 by the seventh valve (V7).

Furthermore, the present invention may further include a second radiator line 90 for connecting so that the second radiator (R2) and the first heat exchanger 44 exchange heat, having one end portion connected to the upstream point of the first heat exchanger 44 of the indoor heating line 40, and having the other end portion connected to the downstream point of the first heat exchanger 44 of the indoor heating line 40, and the second radiator line 90 and the second connection line 80 may be connected to the indoor heating line through the first valve (V1).

The second radiator line 90 is provided with the second radiator (R2). The second radiator (R2) heat-exchanges the outside air of the vehicle and the coolant passing through the second radiator (R2). Furthermore, the second radiator line 90 has one end portion and the other end portion connected to the upstream and the downstream of the first heat exchanger 44 of the indoor heating line 40, respectively. Furthermore, the second radiator line 90 and the second connection line 80 may be connected to the indoor heating line 40 through the first valve (V1) as illustrated. The first valve (V1) is controlled by the controller 110 to selectively connect a flow path or to control a flow rate. Therefore, it is possible to adjust the coolant communication of the indoor heating line 40, the second radiator line 90, and the second connection line 80 by the first valve (V1).

Furthermore, the third radiator line 100 connects the second heat exchanger 34 and the electric component core or the third radiator (R3), and the third radiator line 100, the indoor cooling line 30, and the battery line 10 are simultaneously connected through the second valve (V2). The indoor cooling line 30 and the battery line 10 in the second valve (V2) may be connected to each other through the first connection line 70.

The electric component line 120 may be connected to the electric component core PE, may have one end portion connected to the upstream point of the third radiator (R3) of the third radiator line 100, have the other end portion connected to the downstream of the third radiator (R3) of the third radiator line 100 through the third valve (V3), and may be provided with the third pump (P3) to flow the coolant. The third valve (V3) may be connected between the third radiator line 100 and the electric component line 120 to change flow direction of the coolant.

The battery recovery line may be branched from the battery line 10 and connected to the indoor heating line 40 or the second radiator line 90. The battery recovery line may be branched from the upstream point of the high-voltage battery core (B) of the battery line 10 and connected to each other through the sixth valve (V6), and connected to the branch point of the indoor heating line 40 and the second radiator line 90.

Furthermore, although not separately illustrated, a reservoir tank (RT) for supplying coolant may also be separately provided on each line to supply coolant.

FIGS. 7 to 16 are control configuration diagrams of the integrated thermal management module for the vehicle according to various control modes.

Referring to FIG. 6, in a first mode of cooling the high-voltage battery core (B) through the first radiator (R1), the present invention may further include the controller 110 for controlling the fourth pump (P4) and the seventh valve (V7) so that the coolant having passed through the high-voltage battery core (B) is introduced into the first radiator (R1).

The controller 110 may drive the fourth pump (P4) to flow the coolant of the battery line 10 in the first mode, and control the seventh valve (V7) so that the coolant having passed through is introduced into the first radiator (R1). The coolant heated by passing through the high-voltage battery core (B) may be introduced into the first radiator (R1) to be cooled through the outside air.

Figure 7:
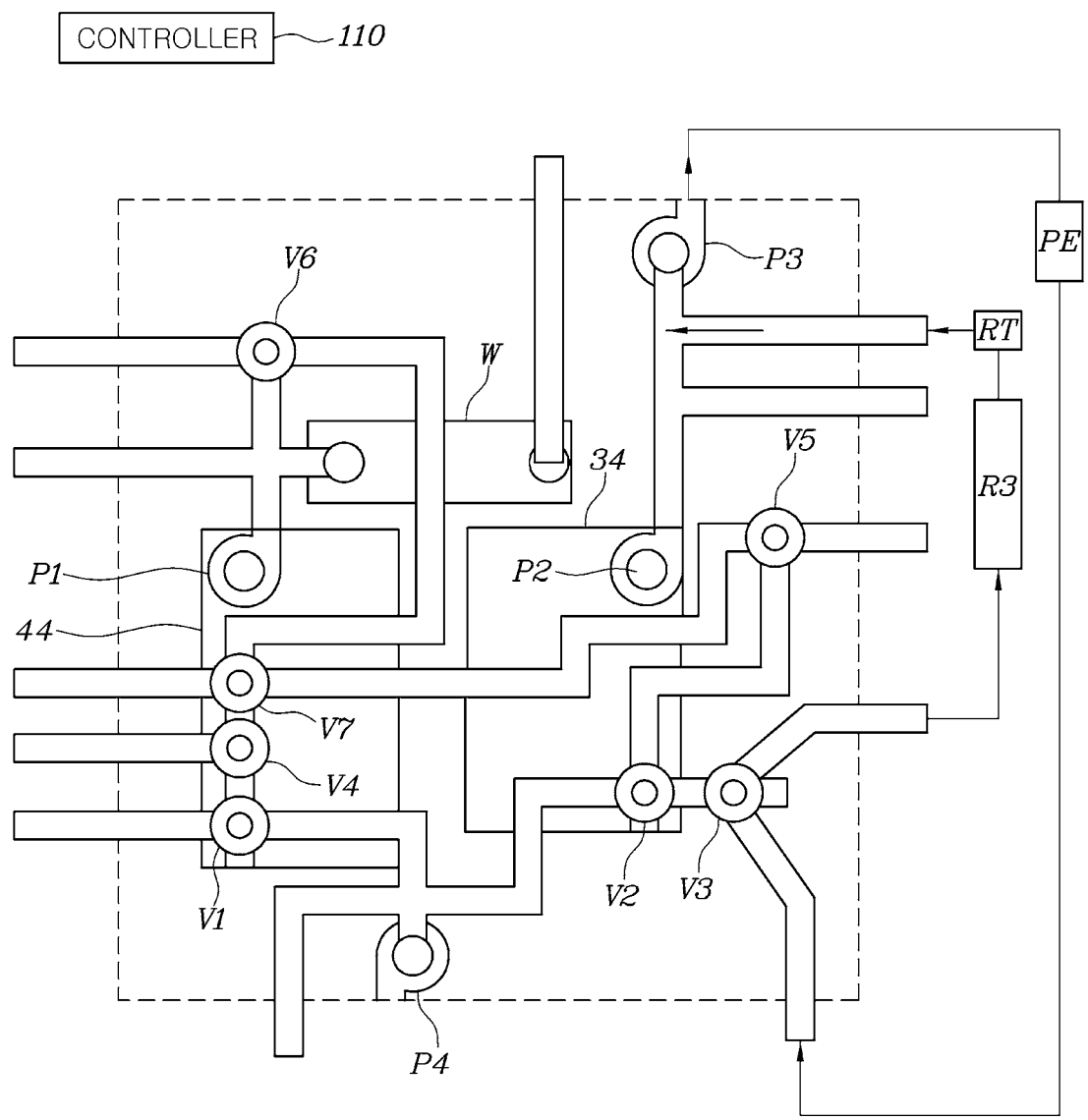
FIG. 7, FIG. 8, FIG. 9, FIG. 10, FIG. 11, FIG. 12, FIG. 13, FIG. 14, FIG. 15, and FIG. 16 are control configuration diagrams of the integrated thermal management module for the vehicle according to an exemplary embodiment of the present invention depending upon various control modes.

Referring to FIG. 7, in a second mode of cooling the electric component core through the third radiator (R3), the present invention may further include the controller 110 for controlling the third pump (P3) and the third valve (V3) so that the coolant having passed through the electric component core is introduced into the third radiator (R3).

The controller 110 may drive the third pump (P3) to flow the coolant of the electric component line 120 in the second mode, and control the third valve (V3) to control so that the coolant having passed through the electric component core is introduced into the third radiator (R3). The coolant heated by passing through the electronic component core may be introduced into the third radiator (R3) to be cooled through the outside air.

Figure 8:
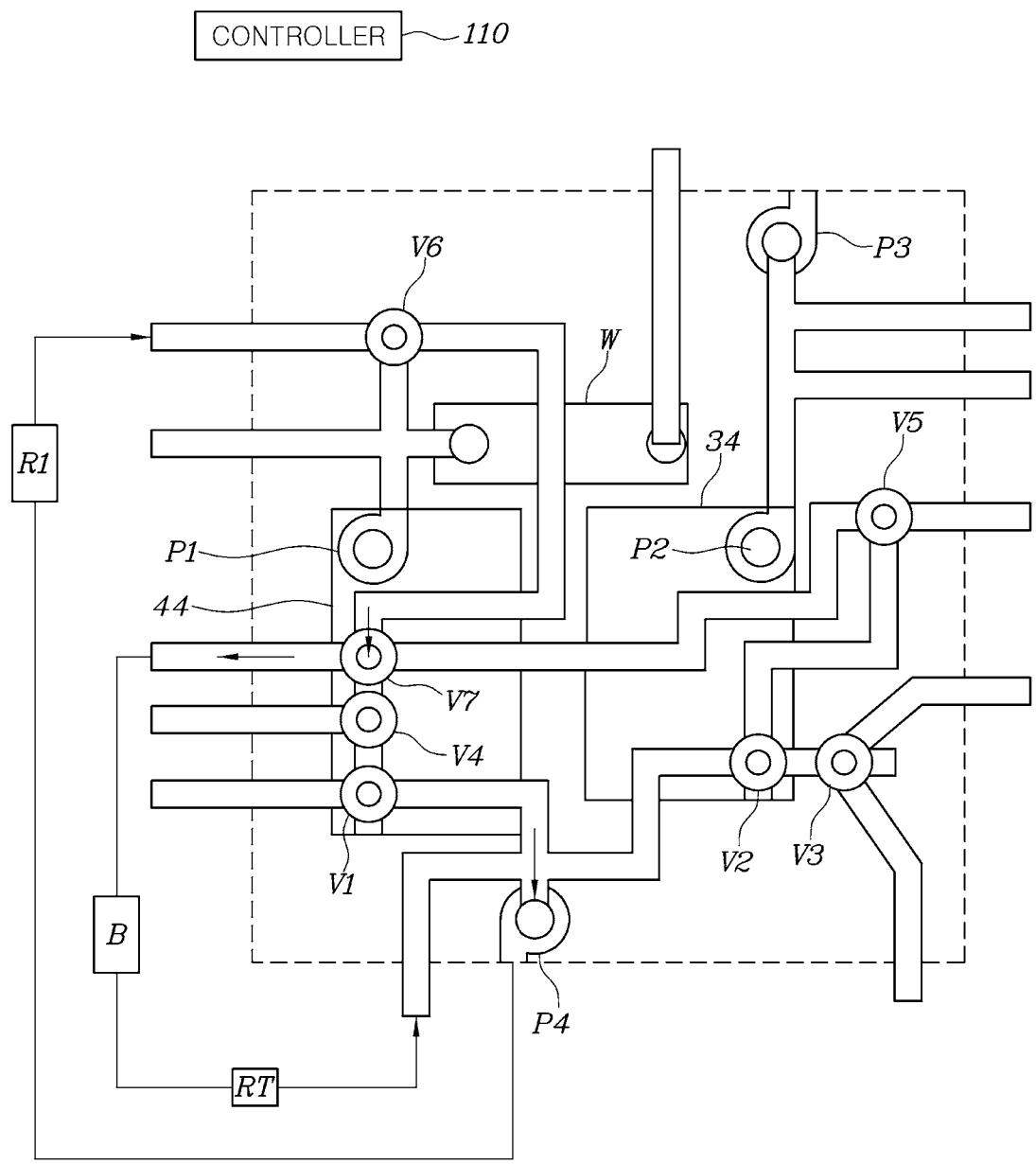

Referring to FIG. 8, in a third mode of cooling the high-voltage battery core (B) through the first radiator (R1) and cooling the electric component core through the third radiator (R3), the present invention may further include the controller 110 for controlling the fourth pump (P4) and the seventh valve (V7) so that the coolant having passed through the high-voltage battery core (B) is introduced into the first radiator (R1), and configured of controlling the third pump (P3) and the third valve (V3) so that the coolant having passed through the electric component core is introduced into the third radiator (R3).

The controller 110 may simultaneously control the control of the first mode and the second mode in the third mode to simultaneously cool the high-voltage battery and the electronic component through the outside air.

Figure 9:
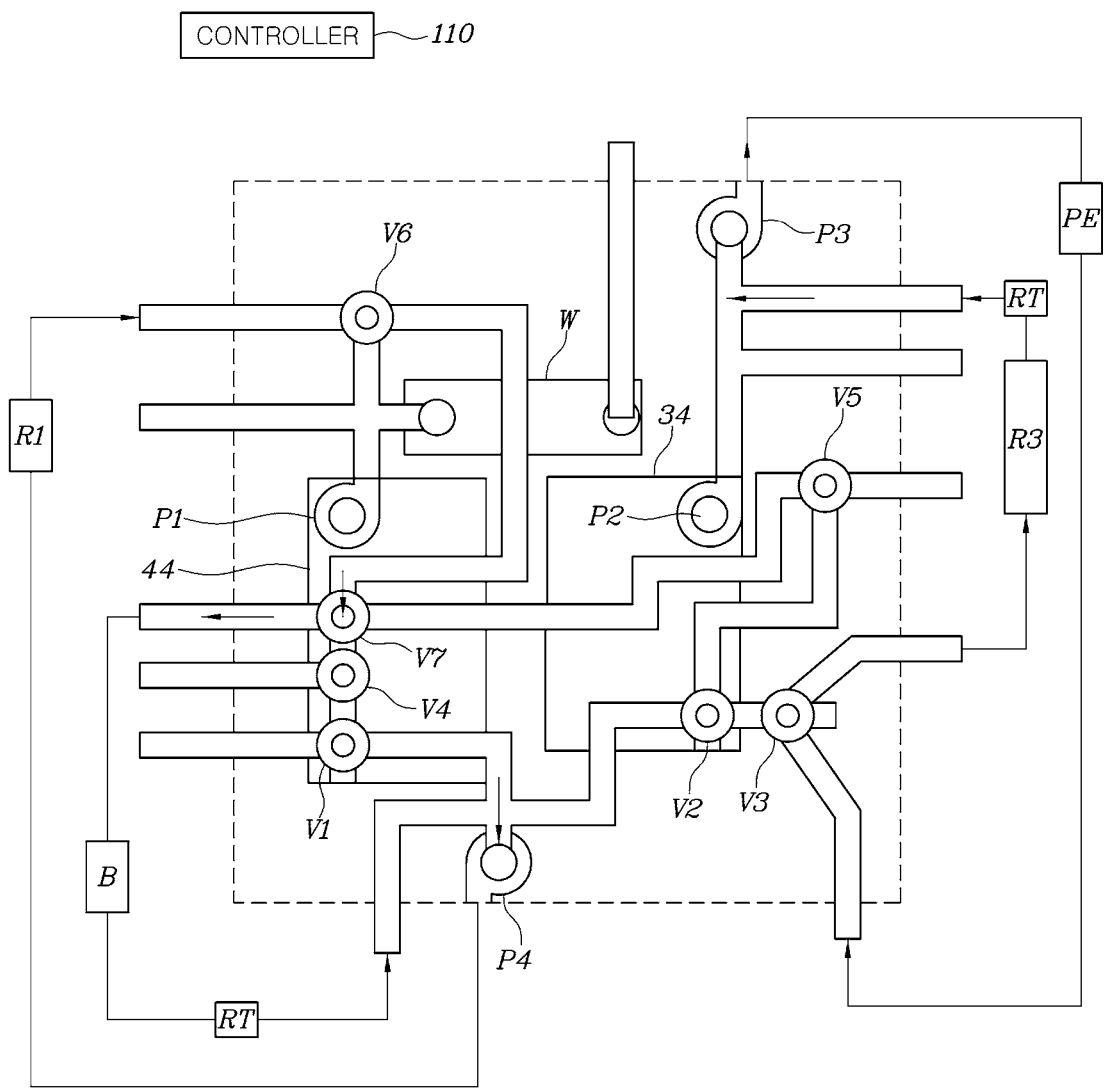

Referring to FIG. 9, in a fourth mode of discharging the air cooled into the indoor space of the vehicle, the present invention may further include the controller 110 for controlling the second pump (P2), the second valve (V2), and the fifth valve (V5) so that the coolant having passed through the second heat exchanger 34 is introduced into the indoor air-conditioning cooling core 32, and configured of controlling the first pump (P1) and the first valve (V1) so that the coolant having passed through the first heat exchanger 44 is introduced into the second radiator (R2).

The controller 110 may drive the second pump (P2) to flow the coolant in the indoor cooling line 30 in the fourth mode, and control the second valve (V2) and the fifth valve (V5) to control so that the coolant cooled in the second heat exchanger 34 is introduced into the indoor air-conditioning cooling core 32.

Furthermore, the controller 110 may drive the first pump (P1) and control the first valve (V1) to flow the coolant heated in the first heat exchanger 44 to the second radiator line 90. The coolant may be cooled by the outside air in the second radiator (R2) provided in the second radiator line 90.

Figure 10:
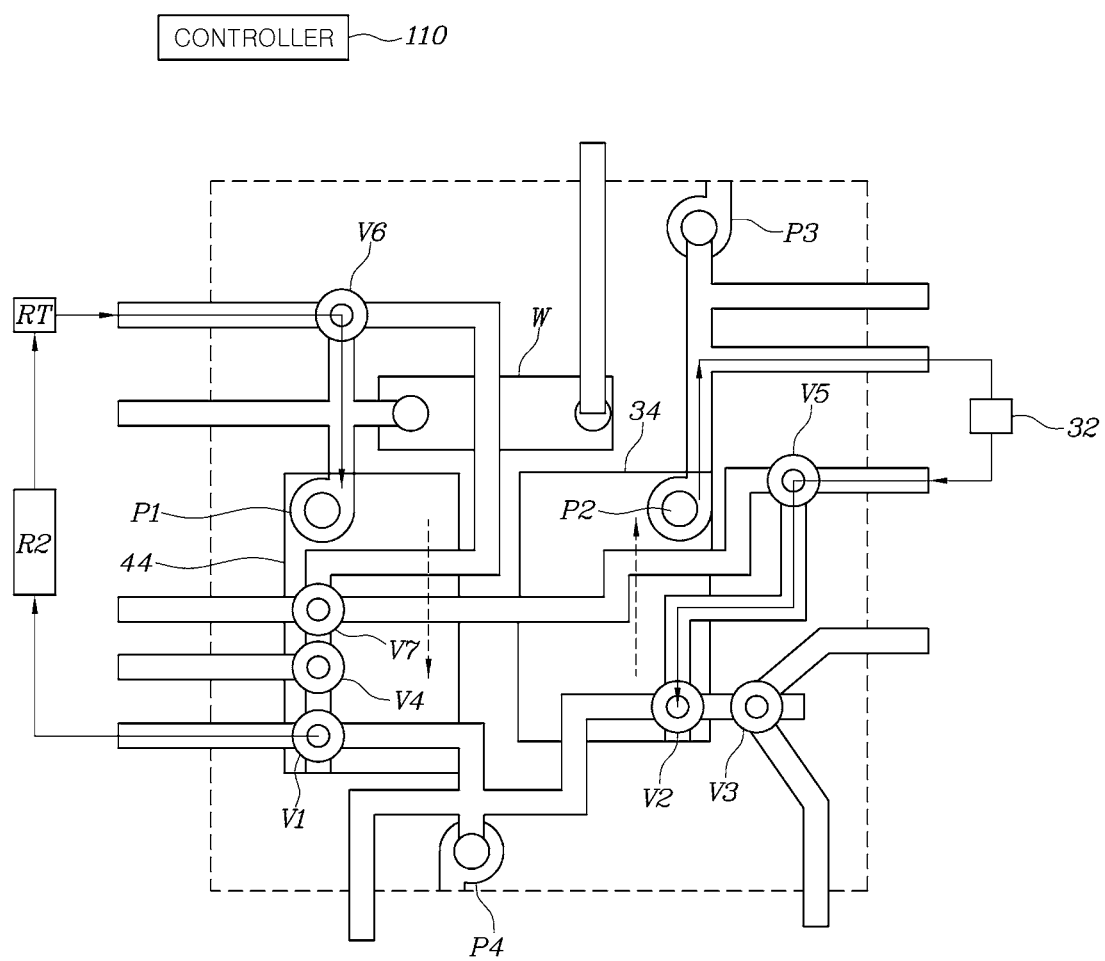

Referring to FIG. 10, in a fifth mode of cooling the high-voltage battery core (B) and discharging the air cooled into the indoor space of the vehicle, the present invention may further include the controller 110 for controlling the second pump (P2), the second valve (V2), the fifth valve (V5), and the seventh valve (V7) so that the coolant having passed through the second heat exchanger 34 is introduced into the indoor air-conditioning cooling core 32 and then is introduced into the high-voltage battery core (B), and configured of controlling the first pump (P1) and the first valve (V1) so that the coolant having passed through the first heat exchanger 44 is introduced into the second radiator (R2).

The controller 110 may control the first pump (P1) and the first valve (V1) in the fifth mode as in the fourth mode. On the other hand, the controller 110 may control the second valve (V2), the fifth valve (V5), and the seventh valve (V7) so that the coolant having passed through the second heat exchanger 34 is introduced into the indoor air-conditioning cooling core 32 and then introduced into the high-voltage battery core (B) differently from the fourth mode.

Figure 11:
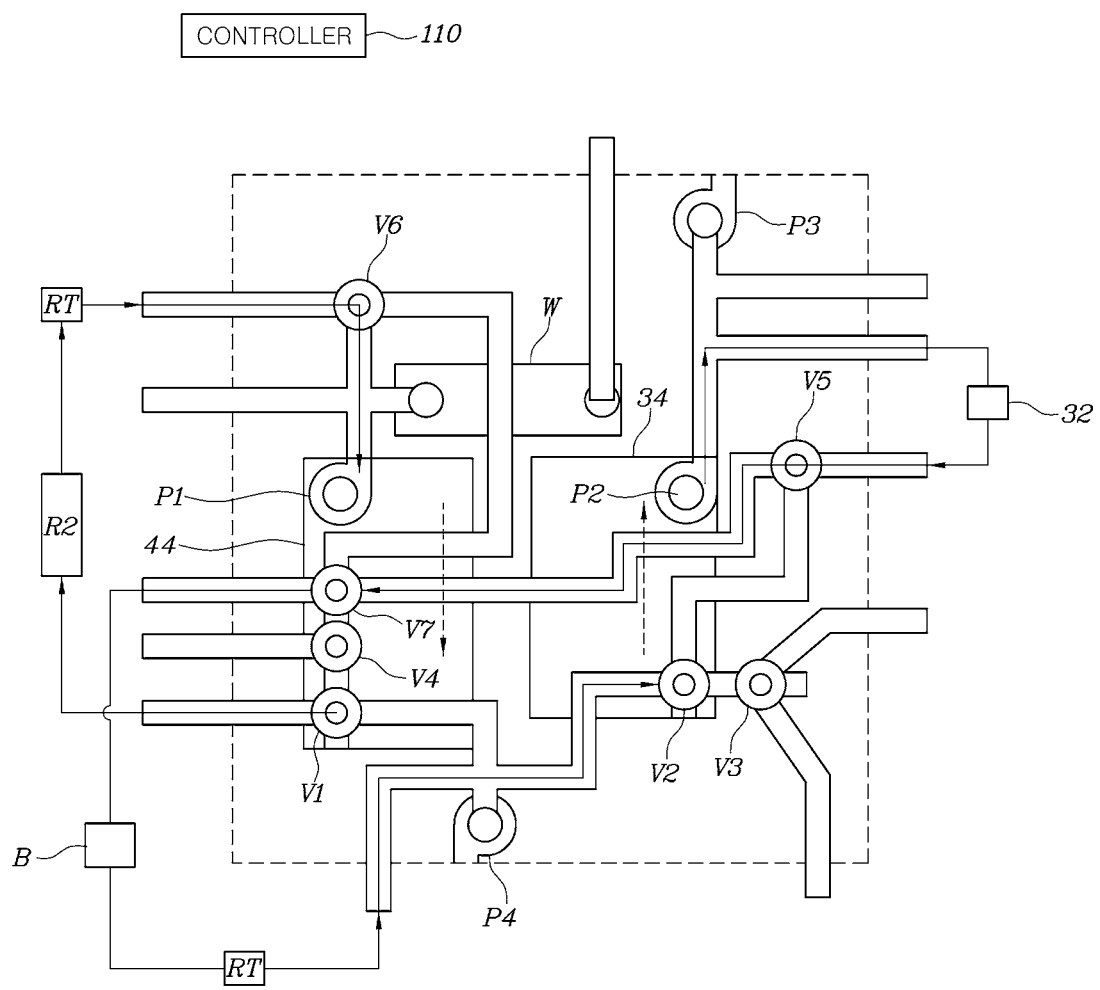

Referring to FIG. 11, in a sixth mode of recovering waste heat of the electric component core and discharging the heated air to the indoor space of the vehicle, the present invention may further include the controller 110 for controlling the first pump (P1), the first valve (V1), and the fourth valve (V4) so that the coolant having passed through the first heat exchanger 44 is introduced into the indoor air-conditioning heating core 42, and configured of controlling the third pump (P3), the second valve (V2), and the third valve (V3) so that the coolant having passed through the second heat exchanger 34 is introduced into the electric component core.

The controller 110 may drive the first pump (P1) and control the first valve (V1) and the fourth valve (V4) to control so that the coolant heated by passing through the first heat exchanger 44 is introduced into the indoor air-conditioning heating core.

Furthermore, the controller 110 may control the third pump (P3), the second valve (V2), and the third valve (V3) to recover the waste heat of the electrical component to control so that the coolant cooled through the second heat exchanger 34 is introduced into the electrical component core.

Figure 12:
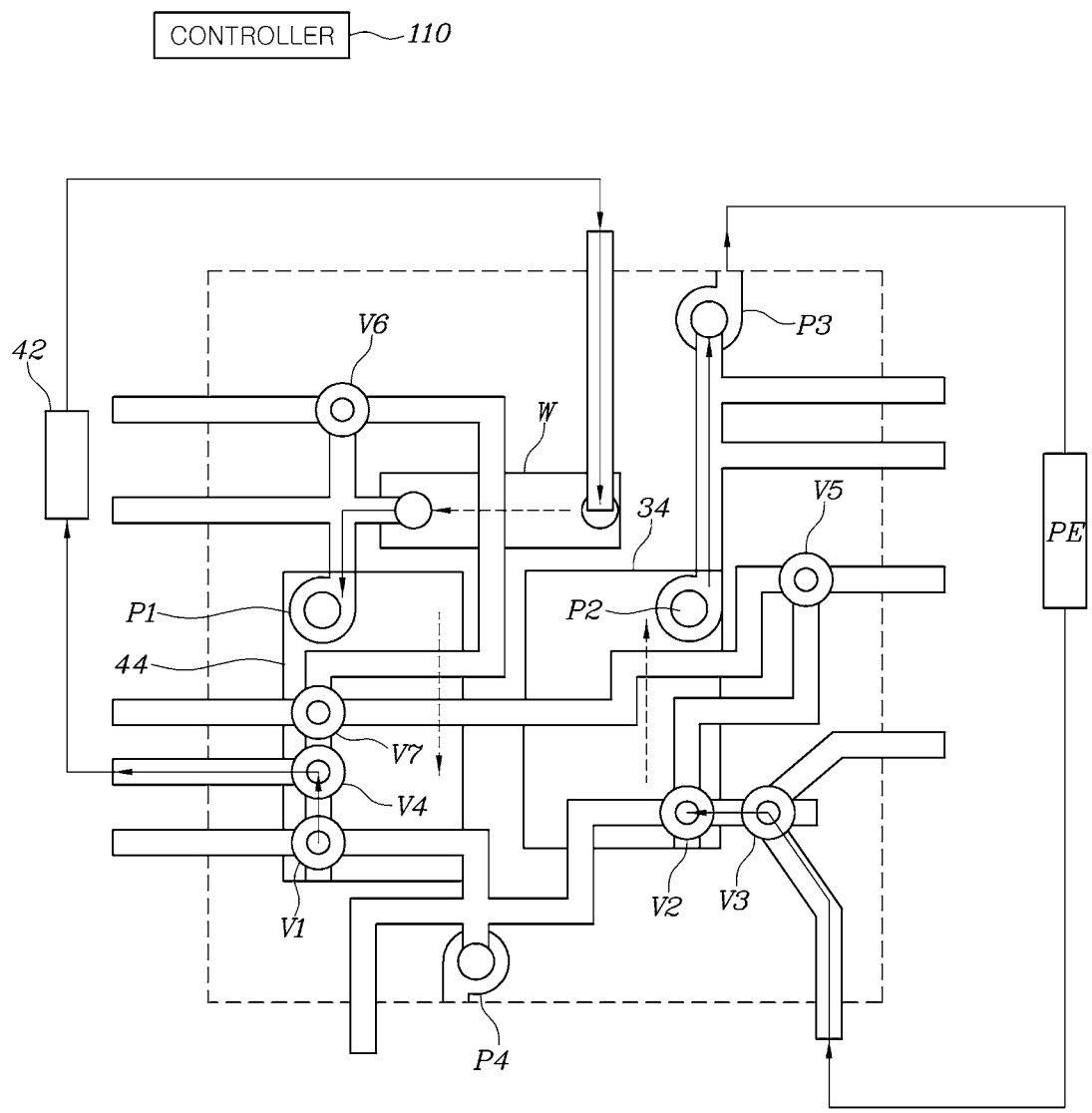

Referring to FIG. 12, in a seventh mode of absorbing heat from the third radiator (R3) and discharging the heated air to the indoor space of the vehicle, the present invention may further include the controller 110 for controlling the first pump (P1), the first valve (V1), and the fourth valve (V4) so that the coolant having passed through the first heat exchanger 44 is introduced into the indoor air-conditioning heating core 42, and configured of controlling the second pump (P2), the second valve (V2), and the third valve (V3) so that the coolant having passed through the second heat exchanger 34 is introduced into the third radiator (R3).

The controller 110 may control the first pump (P1), the first valve (V1), and the fourth valve (P4) so that the coolant having passed through the first heat exchanger 44 is introduced into the indoor air-conditioning heating core 42 in the seventh mode as in the sixth mode.

However, the controller 110 may control the second pump (P2), the second valve (V2), and the third valve (V3) so that the coolant having passed through the second heat exchanger 34 is introduced into the third radiator (R3) in the seventh mode differently from the sixth mode. That is, the coolant cooled by the second heat exchanger 34 may absorb heat from the outside air in the third radiator (R3). That is, it is possible to perform the heat pump function configured for absorbing the heat from the outside air.

Figure 13:
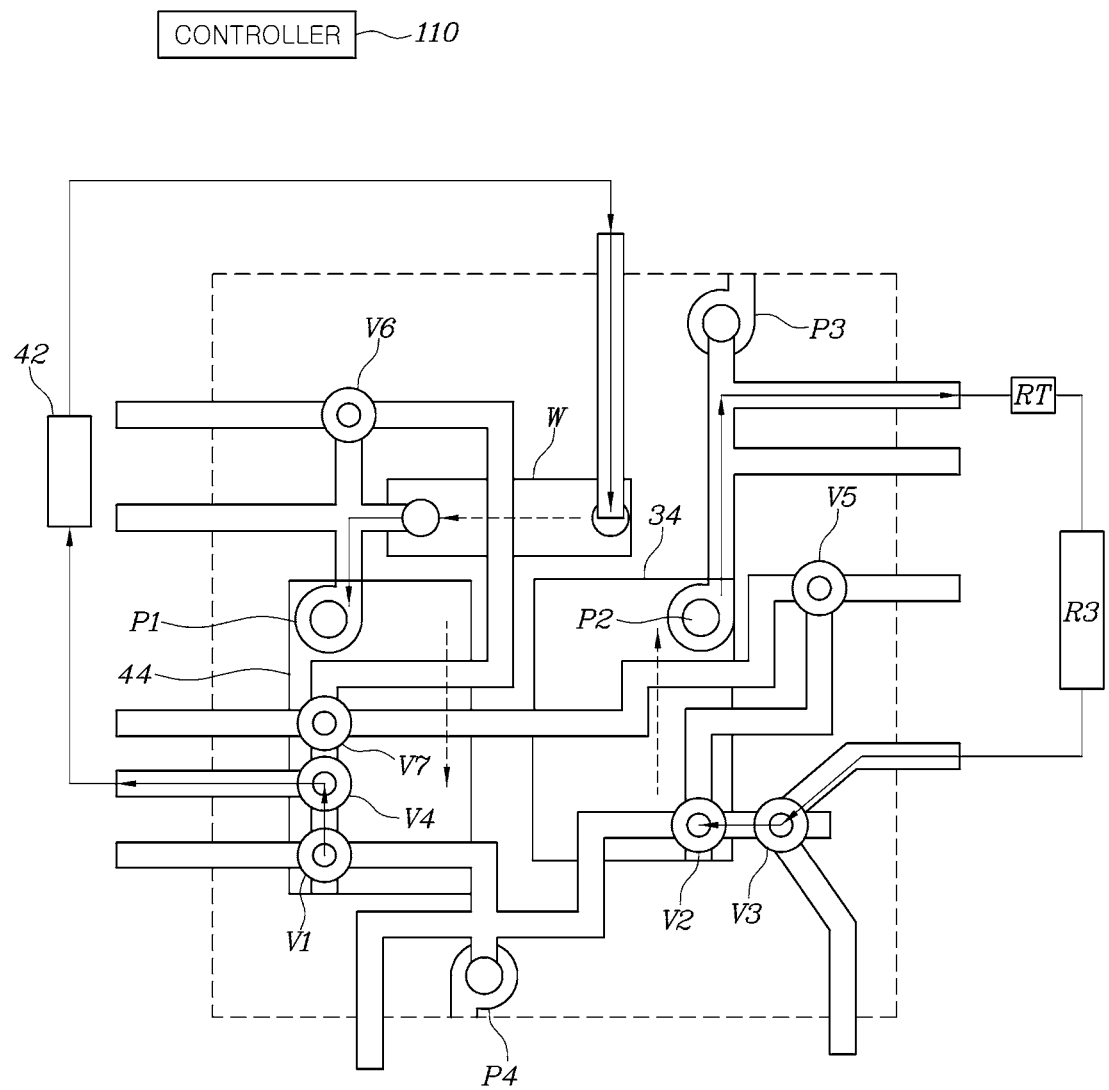

Referring to FIG. 13, in an eighth mode of recovering waste heat of the electric component core, heating the high-voltage battery core (B), and discharging the heated air to the indoor space of the vehicle, the controller 110 may further include the controller 110 for controlling the first pump (P1), the first valve (V1), the seventh valve (V7), and the fourth valve (V4) so that the coolant having passed through the first heat exchanger 44 is introduced into the high-voltage battery core (B) and then introduced into the indoor air-conditioning heating core 42, and configured of controlling the third pump (P3), the second valve (V2), and the third valve (V3) so that the coolant having passed through the second heat exchanger 34 is introduced into the electric component core.

The controller 110 may control the first pump (P1), the first valve (V1), the seventh valve (V7), and the fourth valve (V4) so that the coolant heated by passing through the first heat exchanger 44 is introduced into the high-voltage battery core (B) and then introduced into the indoor air-conditioning heating core 42.

Furthermore, the controller 110 may control the third pump (P3), the second valve (V2), and the third valve (V3) so that the coolant cooled by passing through the second heat exchanger 34 is introduced into the electric component core. That is, it is possible to recover the waste heat of the electric component by introducing the coolant cooled from the second heat exchanger 34 into the electric component core.

Figure 14:
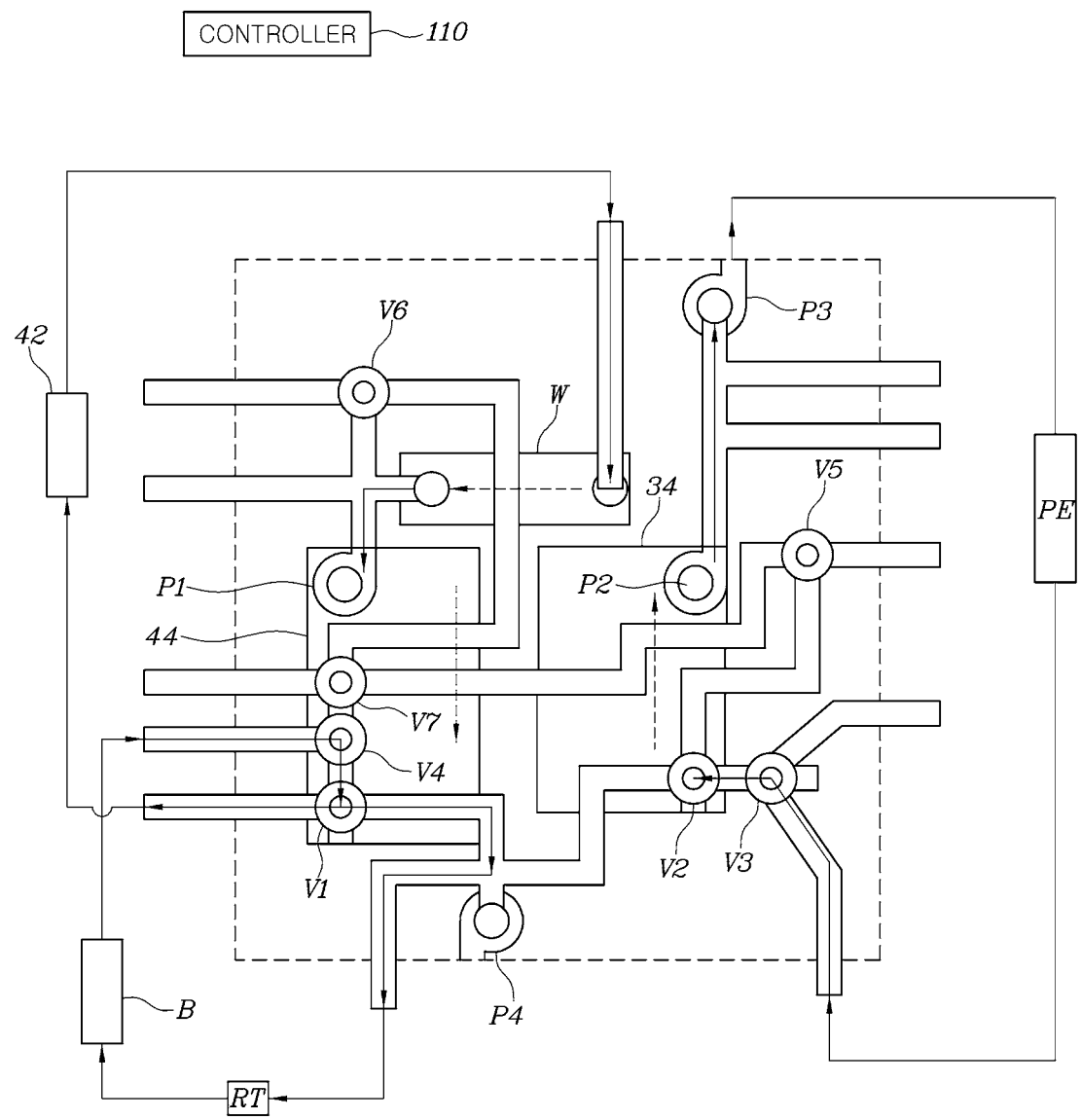

Referring to FIG. 14, in a ninth mode of absorbing heat from the third radiator (R3), heating the high-voltage battery core (B), and discharging the heated air to the indoor space of the vehicle, the present invention may further include the controller 110 for controlling the first pump (P1), the first valve (V1), the seventh valve (V7), and the fourth valve (V4) so that the coolant having passed through the first heat exchanger 44 is introduced into the high-voltage battery core (B) and then introduced into the indoor air-conditioning heating core 42, and configured of controlling the second pump (P2), the second valve (V2), and the third valve (V3) so that the coolant having passed through the second heat exchanger 34 is introduced into the third radiator (R3).

The controller 110 may control the first pump (P1), the first valve (V1), the seventh valve (V7), and the fourth valve (V4) so that the coolant having passed through the first heat exchanger 44 is introduced into the high-voltage battery core (B) and then introduced into the indoor air-conditioning heating core 42 in the ninth mode as in the eighth mode.

However, the controller 110 may control the second pump (P2), the second valve (V2), and the third valve (V3) so that the coolant having passed through the second heat exchanger 34 is introduced into the third radiator (R3) in the ninth mode differently from the eighth mode. The coolant cooled by passing through the second heat exchanger 34 may absorb heat from the outside air in the third radiator (R3). That is, it is possible to perform the heat pump function configured for absorbing the heat from the outside air.

Figure 15:
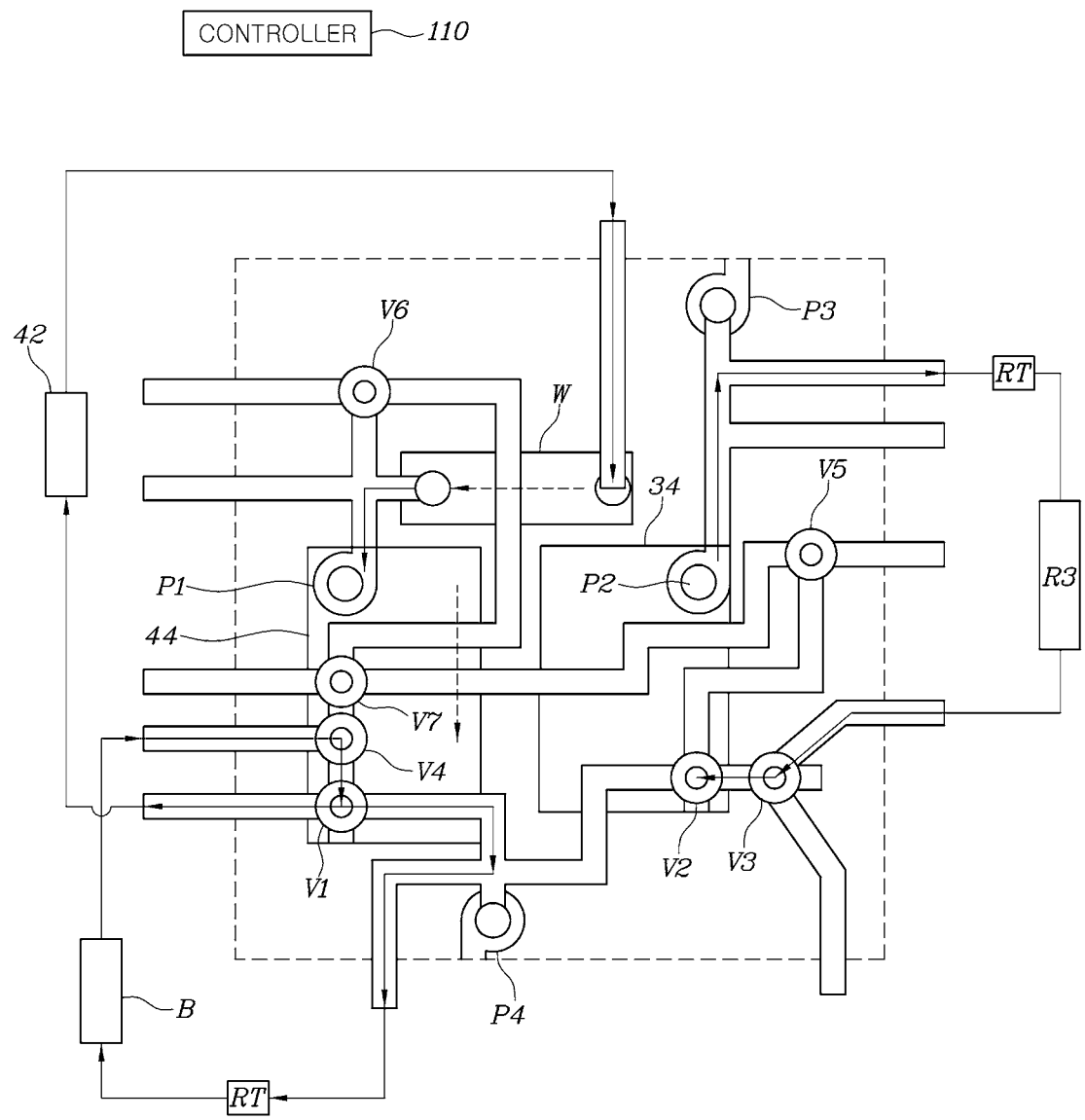
Figure 16:
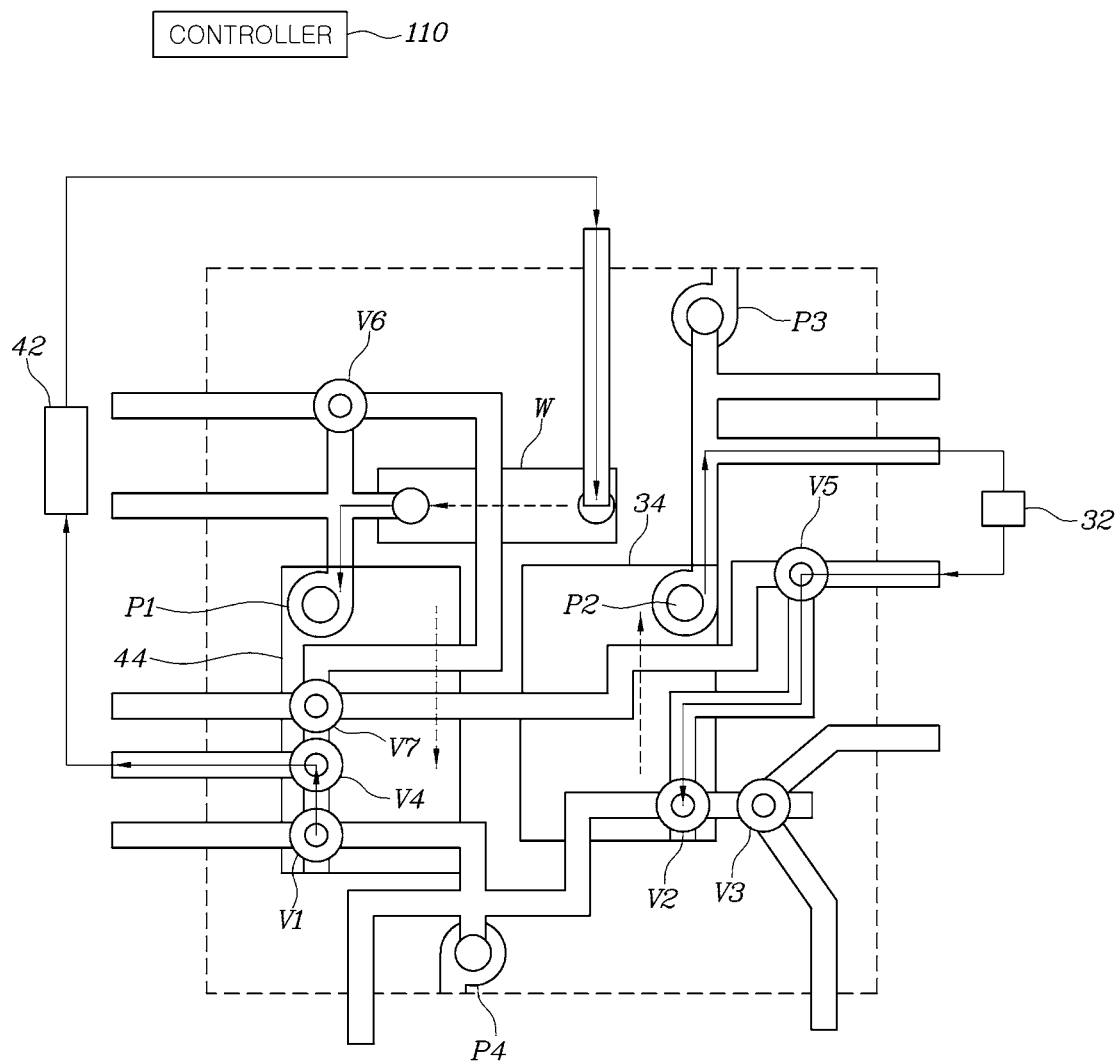

Referring to FIG. 15, in a tenth mode of discharging the dehumidified air to the indoor space of the vehicle, the present invention may further include the controller 110 for controlling the first pump (P1), the first valve (V1), and the fourth valve (V4) so that the coolant having passed through the first heat exchanger 44 is introduced into the indoor air-conditioning heating core 42, and configured of controlling the second pump (P2), the second valve (V2), and the fifth valve (V5) so that the coolant having passed through the second heat exchanger 34 is introduced into the indoor air-conditioning cooling core 32.

The controller 110 may control the first pump (P1), the first valve (V1), and the fourth valve (V4) so that the coolant heated by passing through the first heat exchanger 44 is introduced into the indoor air-conditioning heating core 42 in the tenth mode. Furthermore, the controller 110 may control the second pump (P2), the second valve (V2), and the fifth valve (V5) so that the coolant cooled by passing through the second heat exchanger 34 is introduced into the indoor air-conditioning cooling core 32.

That is, the controller 110 may remove moisture of the air for the indoor air-conditioning by use of both the indoor air-conditioning heating core 42 and the indoor air-conditioning cooling core 32 in the tenth mode.

The controller 110 according to an exemplary embodiment of the present invention may be implemented through a non-volatile memory configured to store data on an algorithm configured to control an operation of various components of a vehicle or software instructions for reproducing the algorithm and a processor configured to perform the operation described below by use of the data stored in the corresponding memory. Here, the memory and the processor may be implemented as separate chips. Alternatively, the memory and the processor may be implemented as a single chip integrated with each other. The processor may take the form of one or more processors.

Referring back to FIGS. 1, 2, and 5, the integrated thermal management module for the vehicle according to various exemplary embodiments of the present invention includes the first pump (P1) for flowing the coolant of the indoor heating line 40 for connecting the first heat exchanger 44 heat-exchanged with the condenser 23 of the refrigerant line 20 and the indoor air-conditioning heating core 42; the second pump (P2) for flowing the coolant of the indoor cooling line 30 for connecting the second heat exchanger 34 heat-exchanged with the evaporator 24 of the refrigerant line 20 and the indoor air-conditioning cooling core 32; the fourth pump (P4) for flowing the coolant of the battery line 10 for connecting the high-voltage battery core (B) and the third radiator (R3); the first valve (V1) simultaneously connected to the second radiator line 90 for connecting the first heat exchanger 44 and the second radiator (R2), the indoor heating line 40, and the battery line 10 to change flow direction of the coolant; and the second valve (V2) simultaneously connected to the indoor cooling line 30 and the battery line 10 to change flow direction of the coolant.

Even according to the integrated thermal management module for the vehicle according to various exemplary embodiments of the present invention, it is possible to enable the indoor air-conditioning control of the vehicle through the indoor heating line 40 and the indoor cooling line 30 that are heat-exchanged with the minimized refrigerant line 20, and at the same time, to enable the high-voltage battery thermal management of the battery line 10.

Additionally, the integrated thermal management module for the vehicle according to various exemplary embodiments of the present invention may further include the fourth valve (V4) connected between the battery line 60, which is branched from the indoor heating line 40 and connected to the battery line 10, and the indoor heating line 40 to change flow direction of the coolant; the fifth valve (V5) connected between the battery cooling line 50, which is branched from the indoor cooling line 30 and connected to the battery line 10, and the indoor cooling line 30 to change flow direction of the coolant; and the seventh valve (V7) simultaneously connected to the battery line 10, the battery heating line 60, and the battery cooling line 50 to change flow direction of the coolant.

Therefore, it is possible to enable the cooling and heating of the high-voltage battery through the refrigerant line 20, enhancing the efficiency of the thermal management of the high-voltage battery.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated thermal management module for a vehicle, the module including:
 - a first pump mounted in an indoor heating line and of flowing coolant of the indoor heating line connecting a first heat exchanger of the indoor heating line heat-exchanged with a condenser of a refrigerant line and an indoor air-conditioning heating core of the indoor heating line;
 - a second pump mounted in an indoor cooling line and of flowing coolant of the indoor cooling line connecting a second heat exchanger of the indoor cooling line heat-exchanged with an evaporator of the refrigerant line and an indoor air-conditioning cooling core of the indoor cooling line;
 - a third pump mounted in an electric component line and of flowing coolant of the electric component line connecting an electric component core of the electric component line and a first radiator;
 - a fourth pump mounted in a battery line and of flowing coolant of the battery line connecting a battery core and a third radiator;
 - a first valve connected to a second radiator line connecting the first heat exchanger and a second radiator, the indoor heating line, and the battery line to change flow direction of the coolant;
 - a second valve connected to a third radiator line connecting the second heat exchanger and the electric component core or the third radiator, the indoor cooling line, and the battery line to change flow direction of the coolant;
 - a third valve connected between the third radiator line and the electric component line to change flow direction of the coolant;
 - a fourth valve connected between a battery heating line, which is branched from the indoor heating line and connected to the battery line, and the indoor heating line to change flow direction of the coolant;
 - a fifth valve connected between a battery cooling line, which is branched from the indoor cooling line and connected to the battery line, and the indoor cooling line to change flow direction of the coolant; and a seventh valve connected to the battery line, the battery heating line, and the battery cooling line to change flow direction of the coolant.

2. The integrated thermal management module for the vehicle according to claim 1,
wherein the first pump, the second pump, the third pump, and the fourth pump, and the first valve, the second valve, the third valve, the fourth valve, the fifth valve, and the seventh valve are modularized to be coupled integrally.

3. The integrated thermal management module for the vehicle according to claim 1, further including:
an upper plate extending in a planar direction; and
a lower plate extending in a same planar direction as the planar direction of the upper plate, and having a flow path formed between the lower plate and the upper plate,
wherein the first pump, the second pump, the third pump, and the fourth pump are inserted into and fixed to the upper plate or the lower plate.

4. The integrated thermal management module for the vehicle according to claim 1, further including:
an upper plate extending in a planar direction of the upper plate; and
a lower plate extending in a same planar direction as the planar direction of the upper plate, and having a flow path formed between the lower plate and the upper plate,
wherein the first valve, the second valve, the third valve, the fourth valve, the fifth valve, and the seventh valve are mounted into the flow path formed between the upper plate and the lower plate to change flow direction of the coolant.

5. The integrated thermal management module for the vehicle according to claim 1, further including a hydrothermal heater mounted in the indoor heating line, heating the coolant flowing therein, and modularized with the first pump, the second pump, the third pump, the fourth pump, the first valve, the second valve, the third valve, the fourth valve, the fifth valve, and the seventh valve to be coupled integrally.

6. The integrated thermal management module for the vehicle according to claim 1, further including:
the condenser mounted in the refrigerant line, and connected to be heat-exchanged with the first heat exchanger;
the evaporator mounted in the refrigerant line, and connected to be heat-exchanged with the second heat exchanger; and
a compressor mounted in the refrigerant line, and configured for compressing refrigerant therein,
wherein the condenser, the evaporator, and the compressor are modularized with the first pump, the second pump, the third pump, the fourth pump, the first valve, the second valve, the third valve, the fourth valve, the fifth valve, and the seventh valve to be coupled integrally.

7. The integrated thermal management module for the vehicle according to claim 1, further including a six valve connected between a battery recovery line, which is branched from the battery line and connected to the indoor heating line or the second radiator line, and the battery line to change flow direction of the coolant.

8. The integrated thermal management module for the vehicle according to claim 1, further including a controller connected to the fourth pump and the seventh valve and configured for controlling the fourth pump and the seventh valve so that the coolant having passed through the battery core is introduced into the first radiator, in a first mode of cooling the battery core through the first radiator mounted in the third radiator line.

9. The integrated thermal management module for the vehicle according to claim 1, further including a controller connected to the third pump and the third valve and configured for controlling the third pump and the third valve so that the coolant having passed through the electric component core is introduced into the third radiator, in a second mode of cooling the electric component core through the third radiator.

10. The integrated thermal management module for the vehicle according to claim 1, further including a controller connected to the fourth pump and the seventh valve and configured for controlling the fourth pump and the seventh valve so that the coolant having passed through the battery core is introduced into the first radiator mounted in the third radiator line, and configured of controlling radiator, and configured of controlling the third pump and the third valve so that the coolant having passed through the electric component core is introduced into the third radiator, in a third mode of cooling the battery core through the first radiator and cooling the electric component core through the third radiator.

11. The integrated thermal management module for the vehicle according to claim 1, further including a controller connected to the second pump, the second valve, and the fifth valve and configured for controlling the second pump, the second valve, and the fifth valve so that the coolant having passed through the second heat exchanger is introduced into the indoor air-conditioning cooling core, and configured of controlling the first pump and the first valve so that the coolant having passed through the first heat exchanger is introduced into the second radiator, in a fourth mode of discharging the cooled air to an indoor space of the vehicle.

12. The integrated thermal management module for the vehicle according to claim 1, further including a controller connected to the second pump, the second valve, the fifth valve, and the seventh valve and configured for controlling the second pump, the second valve, the fifth valve, and the seventh valve so that the coolant having passed through the second heat exchanger is introduced into the indoor air-conditioning cooling core, and configured of controlling the first pump and the first valve so that the coolant having passed through the first heat exchanger is introduced into the second radiator, in a fifth mode of cooling the battery core and discharging the cooled air to an indoor space of the vehicle.

13. The integrated thermal management module for the vehicle according to claim 1, further including a controller connected to the first pump, the first valve, and the fourth valve and configured for controlling the first pump, the first valve, and the fourth valve so that the coolant having passed through the first heat exchanger is introduced into the indoor air-conditioning heating core and then introduced into the battery core, and configured of controlling the third pump, the second valve, and the third valve so that the coolant having passed through the second heat exchanger is introduced into the electric component core, in a sixth mode of recovering waste heat of the electric component core and discharging the heated air to an indoor space of the vehicle.

14. The integrated thermal management module for the vehicle according to claim 1, further including a controller connected to the first pump, the first valve, and the fourth valve and configured for controlling the first pump, the first valve, and the fourth valve so that the coolant having passed through the first heat exchanger is introduced into the indoor air-conditioning heating core, and configured of controlling the second pump, the second valve, and the third valve so that the coolant having passed through the second heat exchanger is introduced into the third radiator, in a seventh mode of absorbing heat from the third radiator and discharging the heated air to an indoor space of the vehicle.

15. The integrated thermal management module for the vehicle according to claim 1, further including a controller connected to the first pump, the first valve, the seventh valve, and the fourth valve and configured for controlling the first pump, the first valve, the seventh valve, and the fourth valve so that the coolant having passed through the first heat exchanger is introduced into the battery core and then introduced into the indoor air-conditioning heating core, and configured of controlling the third pump, the second valve, and the third valve so that the coolant having passed through the second heat exchanger is introduced into the electric component core, in an eighth mode of recovering waste heat of the electric component core, heating the battery core, and discharging the heated air to an indoor space of the vehicle.

16. The integrated thermal management module for the vehicle according to claim 1, further including a controller connected to the first pump, the first valve, the seventh valve, and the fourth valve and configured for controlling the first pump, the first valve, the seventh valve, and the fourth valve so that the coolant having passed through the first heat exchanger is introduced into the battery core and then introduced into the indoor air-conditioning heating core, and configured of controlling the second pump, the second valve, and the third valve so that the coolant having passed through the second heat exchanger is introduced into the third radiator, in a ninth mode of absorbing heat from the third radiator, heating the battery core, and discharging the heated air to an indoor space of the vehicle.

17. The integrated thermal management module for the vehicle according to claim 1, further including a controller connected to the first pump, the first valve, and the fourth valve and configured for controlling the first pump, the first valve, and the fourth valve so that the coolant having passed through the first heat exchanger is introduced into the indoor air-conditioning heating core, and configured of controlling the second pump, the second valve, and the fifth valve so that the coolant having passed through the second heat exchanger is introduced into the indoor air-conditioning cooling core, in a tenth mode of discharging the dehumidified air to an indoor space of the vehicle.

18. An integrated thermal management module for a vehicle, the module including:
a first pump mounted in an indoor heating line and of flowing coolant of the indoor heating line connecting a first heat exchanger of the indoor heating line heat-exchanged with a condenser of a refrigerant line and an indoor air-conditioning heating core of the indoor heating line;
a second pump mounted in an indoor cooling line and of flowing coolant of the indoor cooling line connecting a second heat exchanger heat-exchanged with an evaporator of a refrigerant line and an indoor air-conditioning cooling core;
a fourth pump mounted in a battery line and of flowing coolant of the battery line connecting a battery core and a third radiator;
a first valve connected to a second radiator line connecting the first heat exchanger and a second radiator, the indoor heating line, and the battery line to change flow direction of the coolant; and
a second valve connected to the indoor cooling line and the battery line to change flow direction of the coolant.

19. The integrated thermal management module for the vehicle according to claim 18, further including:
a fourth valve connected between a battery heating line, which is branched from the indoor heating line and connected to the battery line, and the indoor heating line to change flow direction of the coolant;
a fifth valve connected between a battery cooling line, which is branched from the indoor cooling line and connected to the battery line, and the indoor cooling line to change flow direction of the coolant; and
a seventh valve connected to the battery line, the battery heating line, and the battery cooling line to change flow direction of the coolant.

20. The integrated thermal management module for the vehicle according to claim 19, further including:
a third pump mounted in an electric component line and of flowing coolant of the electric component line connecting an electric component core of the electric component line and a first radiator;
a third valve connected between a third radiator line and the electric component line to change flow direction of the coolant; and
a six valve connected between a battery recovery line, which is branched from the battery line and connected to the indoor heating line or the second radiator line, and the battery line to change flow direction of the coolant.

* * * * *